US012783012B2

(12) United States Patent
Pyo et al.

(10) Patent No.: US 12,783,012 B2
(45) Date of Patent: Nov. 3, 2026

(54) DISPLAY DEVICE

(71) Applicant: LG ELECTRONICS INC., Seoul (KR)

(72) Inventors: Jonggil Pyo, Seoul (KR); Jaehun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 155 days.

(21) Appl. No.: 18/870,749

(22) PCT Filed: Jun. 3, 2022

(86) PCT No.: PCT/KR2022/007897
§ 371 (c)(1),
(2) Date: Dec. 2, 2024

(87) PCT Pub. No.: WO2023/234444
PCT Pub. Date: Dec. 7, 2023

(65) Prior Publication Data
US 2025/0199584 A1 Jun. 19, 2025

(51) Int. Cl.

| | |
|---|---|
| ***G06F 1/16*** | (2006.01) |
| ***F16H 1/16*** | (2006.01) |
| ***H05K 5/00*** | (2025.01) |
| ***H05K 7/00*** | (2006.01) |

(52) U.S. Cl.
CPC ............. *G06F 1/1652* (2013.01); *F16H 1/16* (2013.01)

(58) Field of Classification Search
CPC .... G06F 1/1652; G06F 1/1632; G06F 1/1654; F16H 1/16; H02G 11/003; B65H 75/368
See application file for complete search history.

(56) References Cited

U.S. PATENT DOCUMENTS

| | | | | |
|---|---|---|---|---|
| 11,423,811 | B2 * | 8/2022 | Choi | G06F 1/1652 |
| 11,854,449 | B2 * | 12/2023 | Yeo | G06F 1/1652 |
| 12,054,103 | B2 * | 8/2024 | Jang | B60K 35/22 |
| 12,216,501 | B2 * | 2/2025 | Wang | G06F 1/1675 |
| 12,249,259 | B2 * | 3/2025 | Kim | G09F 9/301 |
| 12,456,395 | B2 * | 10/2025 | Jang | B60K 35/00 |
| 12,617,278 | B2 * | 5/2026 | Jang | B60K 35/22 |

(Continued)

FOREIGN PATENT DOCUMENTS

| | | |
|---|---|---|
| CN | 109996019 A | 7/2019 |
| CN | 109996019 B | 7/2021 |

(Continued)

*Primary Examiner* — Anthony M Haughton
(74) *Attorney, Agent, or Firm* — Birch, Stewart, Kolasch & Birch, LLP

(57) ABSTRACT

A display device is disclosed. The display device includes: a display panel with translucency; a cover disposed at a rear of the display panel; a roller adjacent to one side of the display panel and extending along the one side, the roller around which the cover is wound or from which the cover is unwound; and a drive assembly which moves the cover in a direction away from or toward the one side of the display panel, wherein the drive assembly includes: a first wire adjacent to one end of the cover in a longitudinal direction of the roller, and fixed to the cover; a second wire adjacent to the other end of the cover in the longitudinal direction of the roller, and fixed to the cover; and a motor providing power to the first wire and the second wire.

15 Claims, 26 Drawing Sheets

1

(56) References Cited

U.S. PATENT DOCUMENTS

| | | | | |
|---|---|---|---|---|
| 2022/0210935 | A1* | 6/2022 | Lee | G06F 1/1601 |
| 2022/0408574 | A1* | 12/2022 | Park | G06F 1/16 |
| 2023/0132282 | A1* | 4/2023 | Kim | B65H 75/44<br>361/679.01 |
| 2024/0179861 | A1* | 5/2024 | Kim | G06F 1/1601 |
| 2025/0199584 | A1* | 6/2025 | Pyo | G06F 1/16 |
| 2025/0341856 | A1* | 11/2025 | Pyo | G06F 1/1601 |

FOREIGN PATENT DOCUMENTS

| | | | |
|---|---|---|---|
| JP | 2007-10886 | A | 1/2007 |
| JP | 2021-194482 | A | 12/2021 |
| KR | 20-2009-0005043 | U | 5/2009 |
| KR | 10-2014-0090052 | A | 7/2014 |
| KR | 10-2224096 | B1 | 3/2021 |
| KR | 10-2022-0032044 | A | 3/2022 |

* cited by examiner

[FIG. 1]
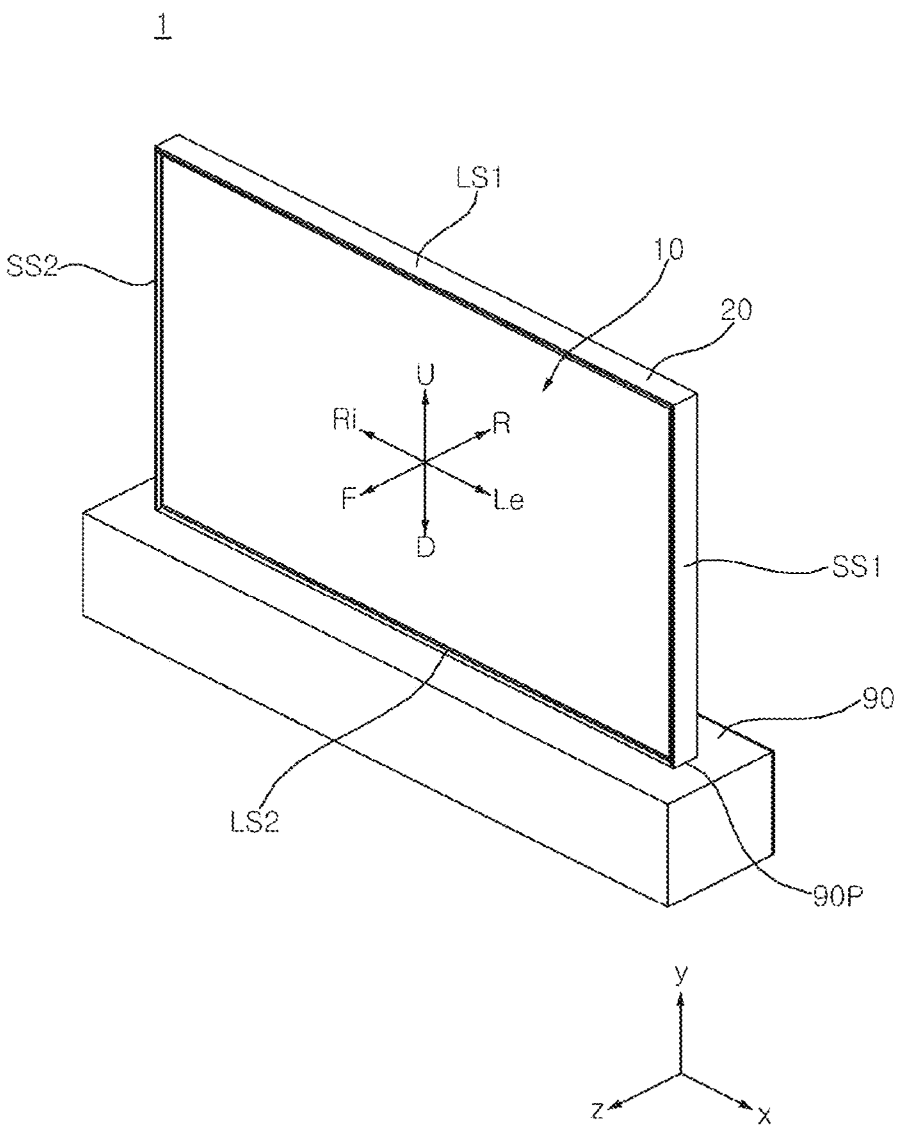

[FIG. 2]
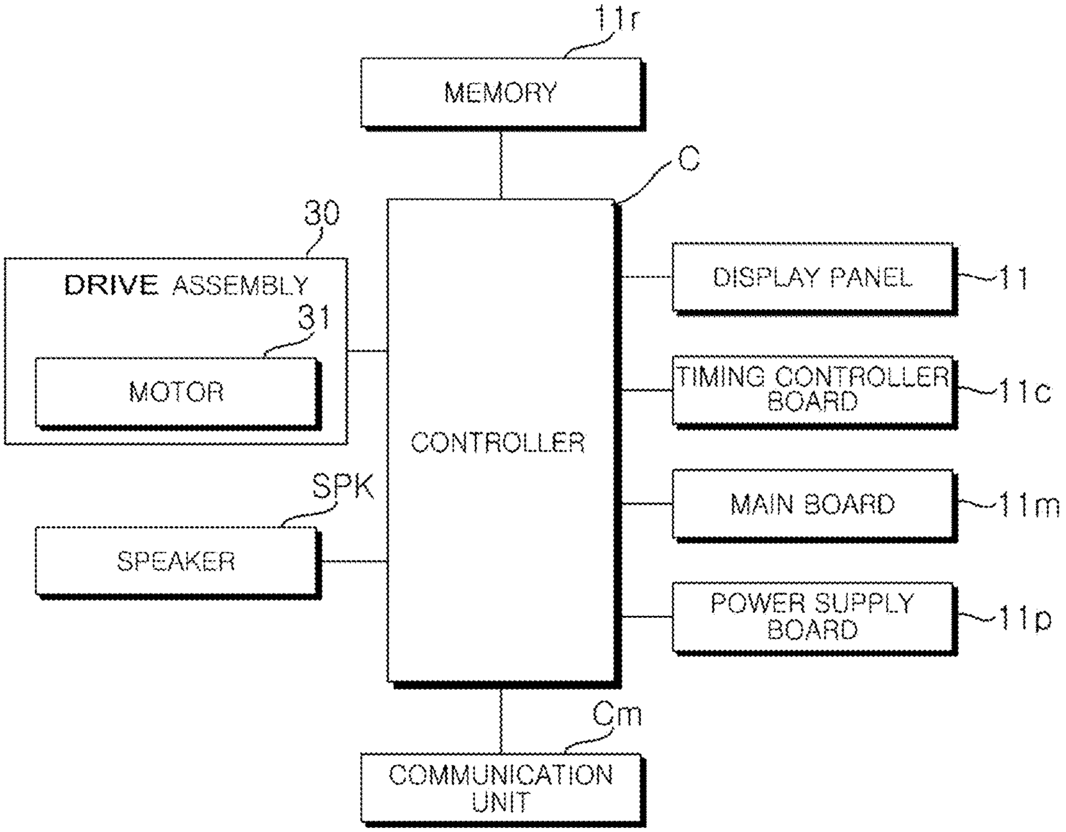

[FIG. 3]
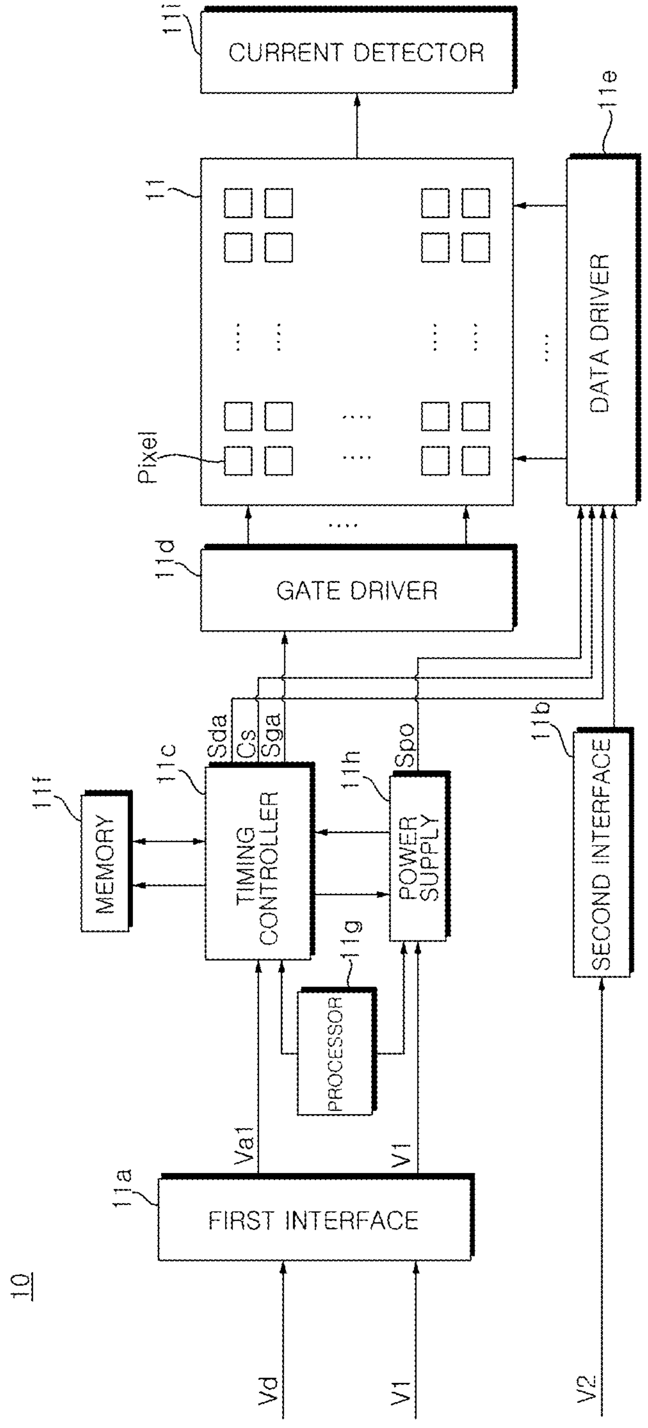

[FIG. 4]
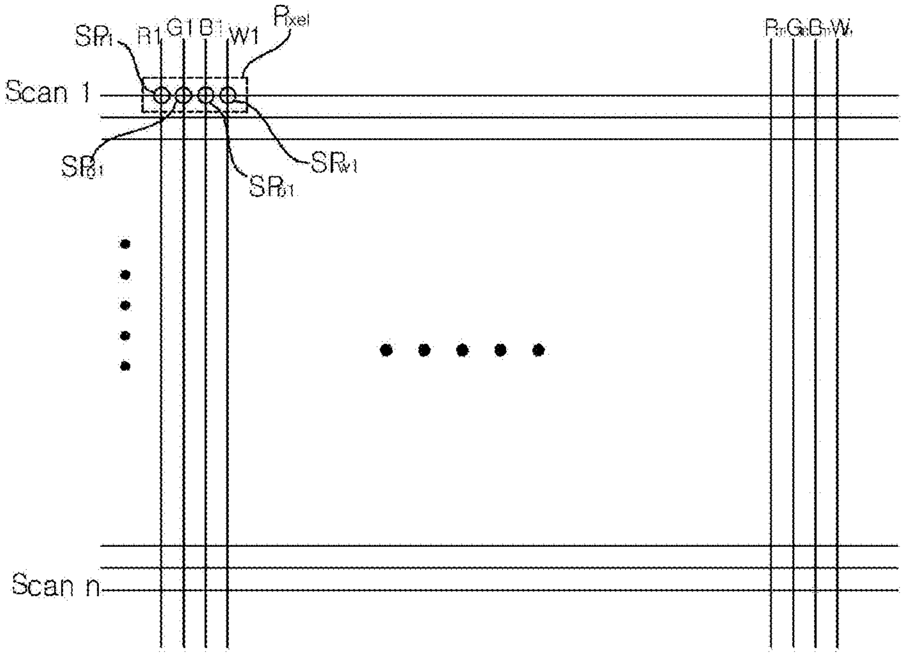

[FIG. 5]
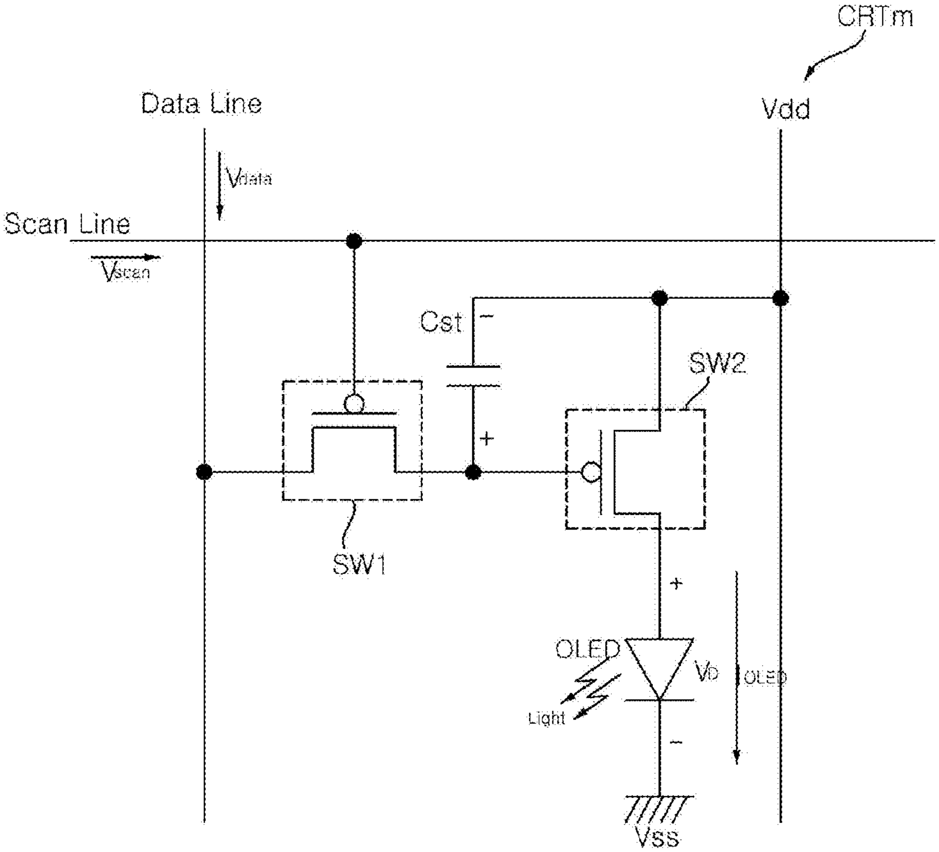

[FIG. 6]
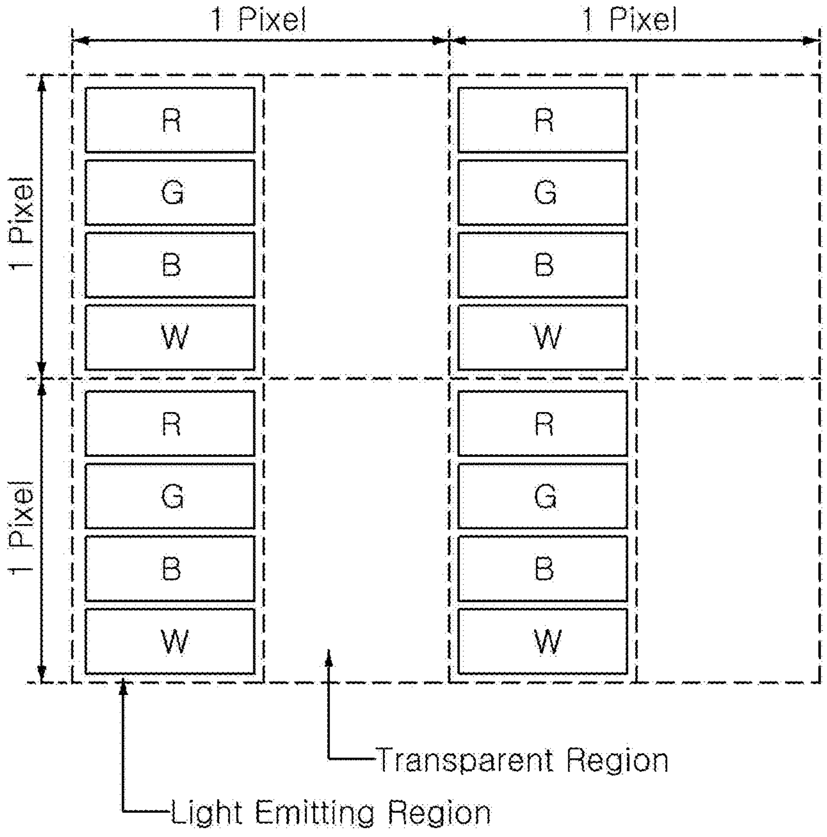

[FIG. 7]
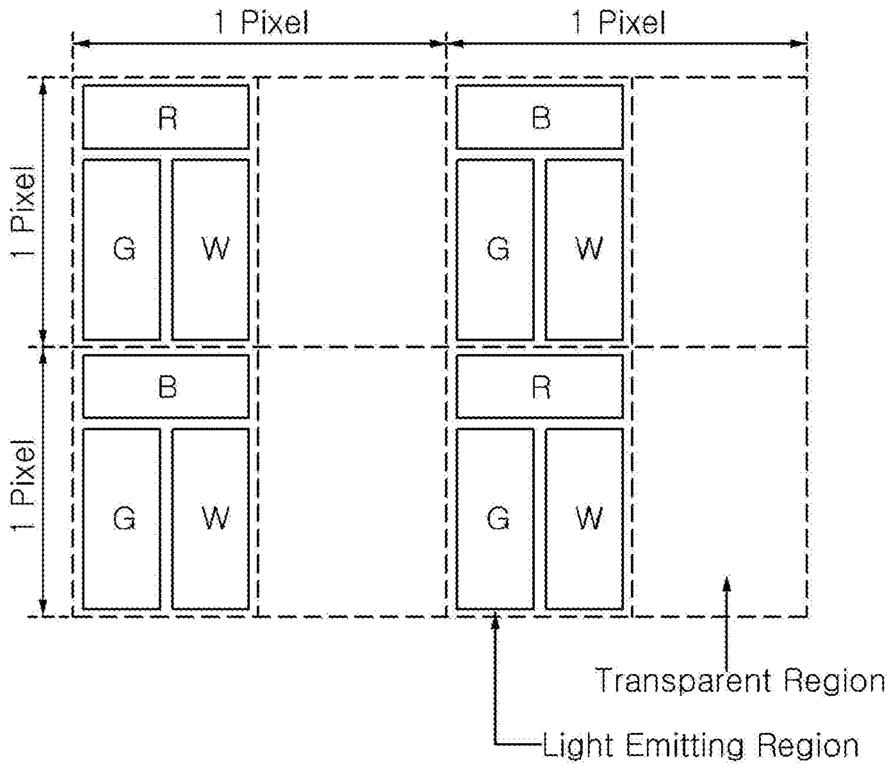

[FIG. 8]
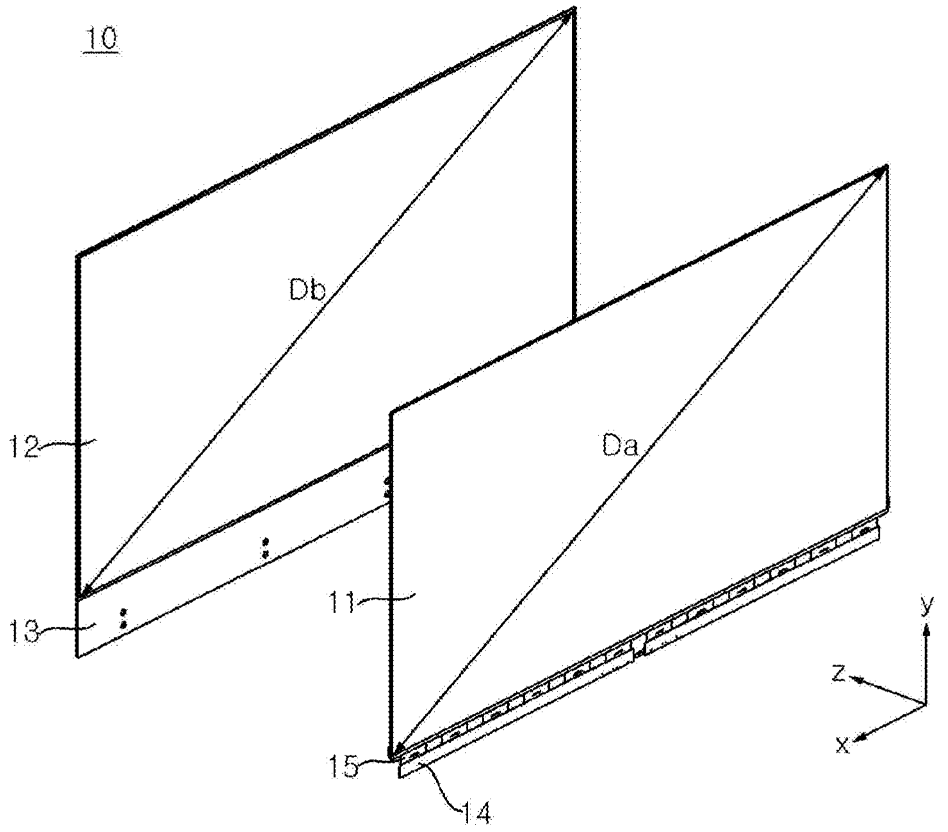

[FIG. 9]
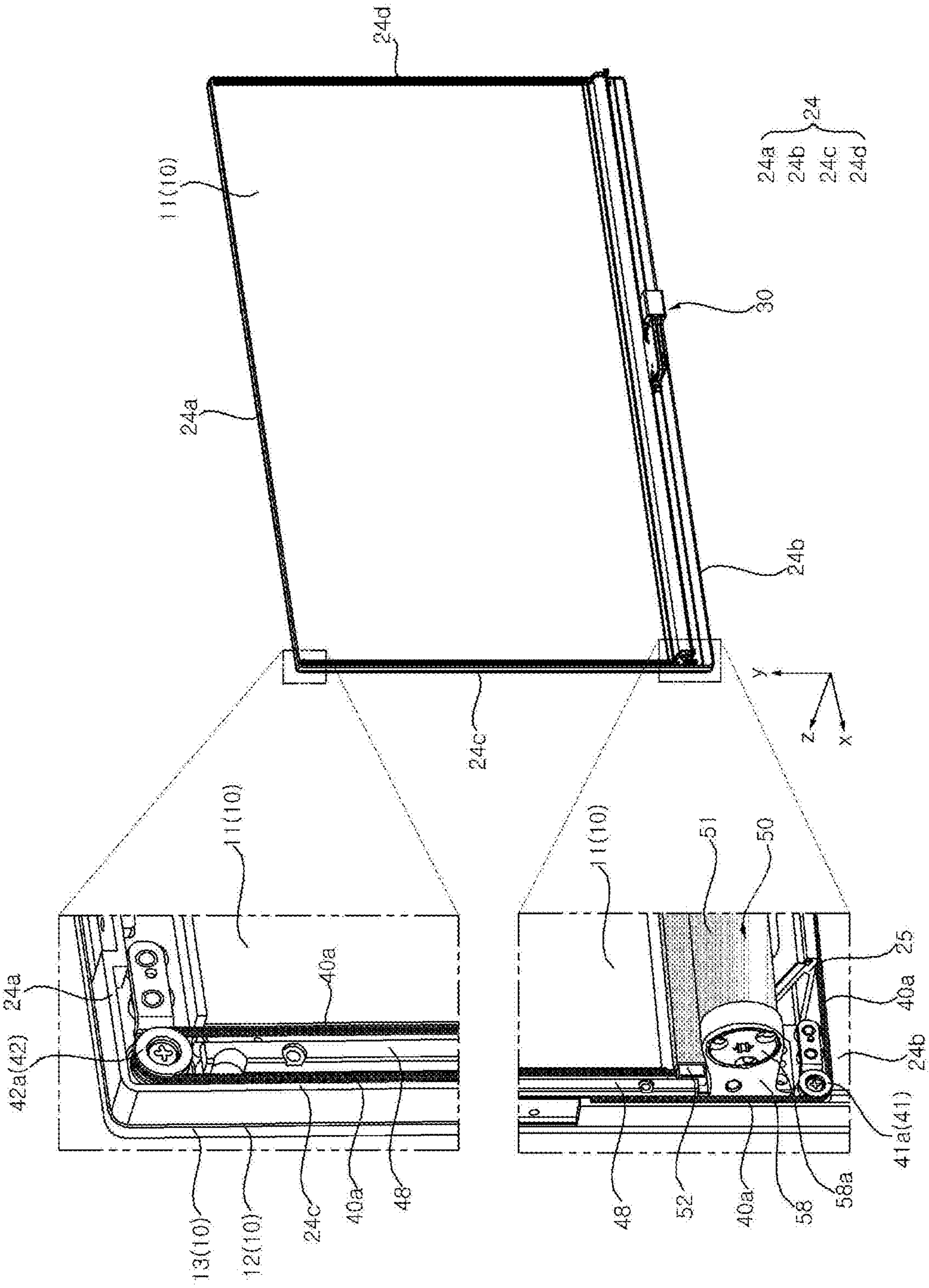

[FIG. 10]
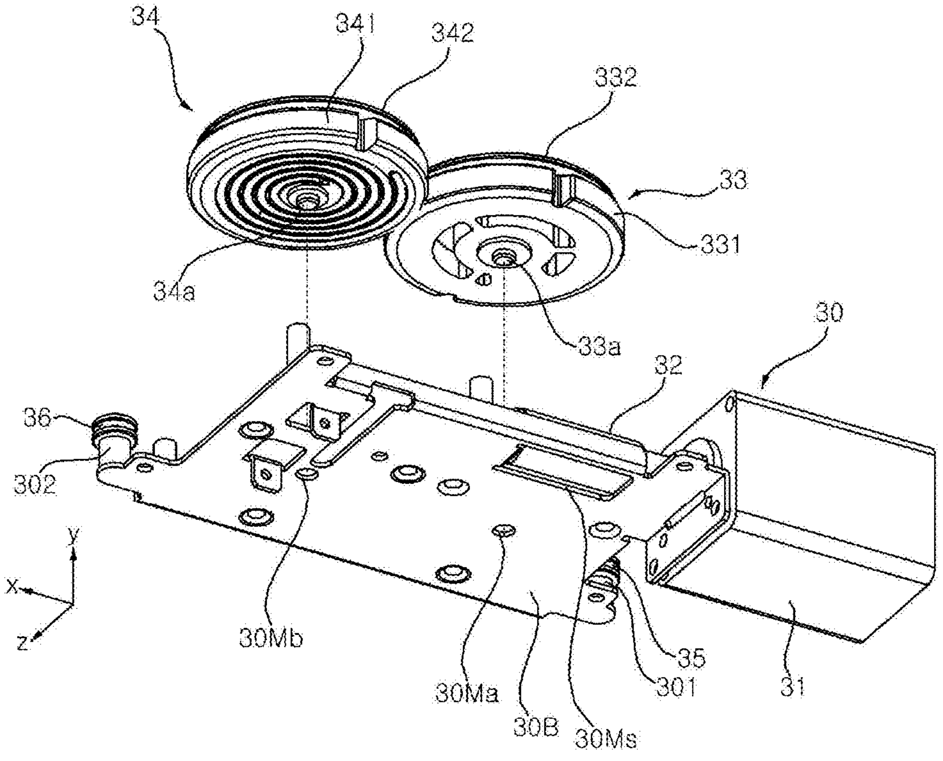

[FIG. 11]
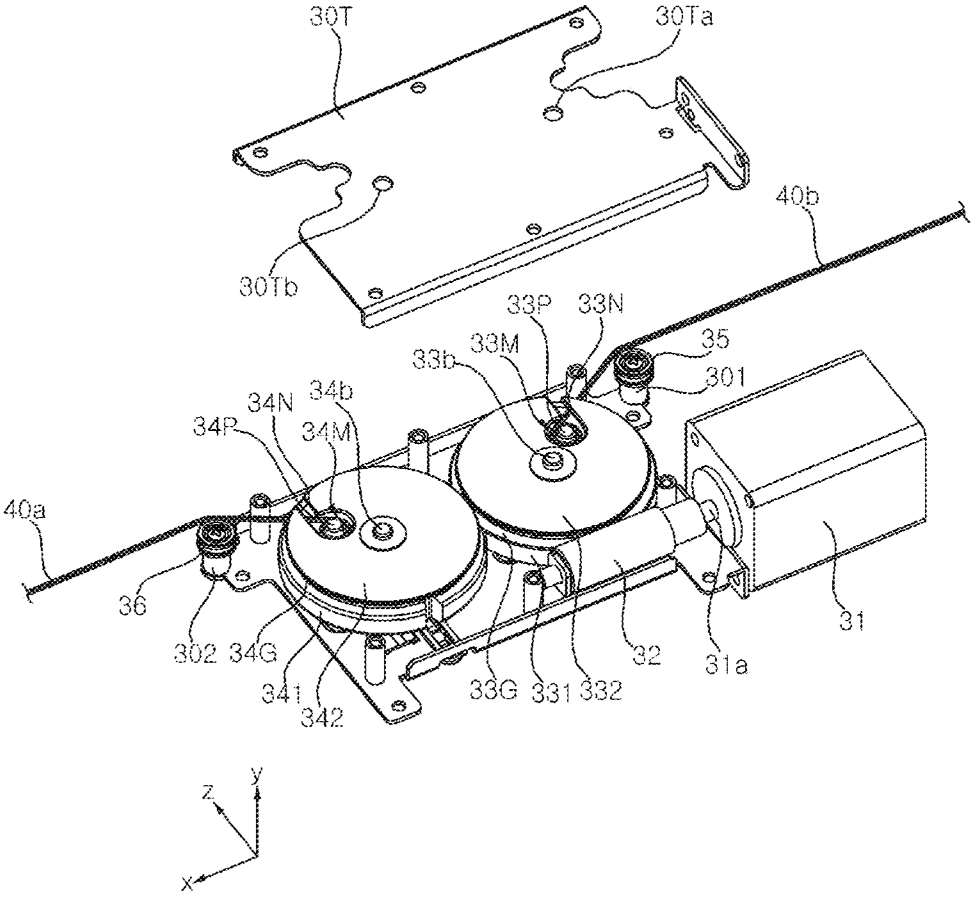

[FIG. 12]
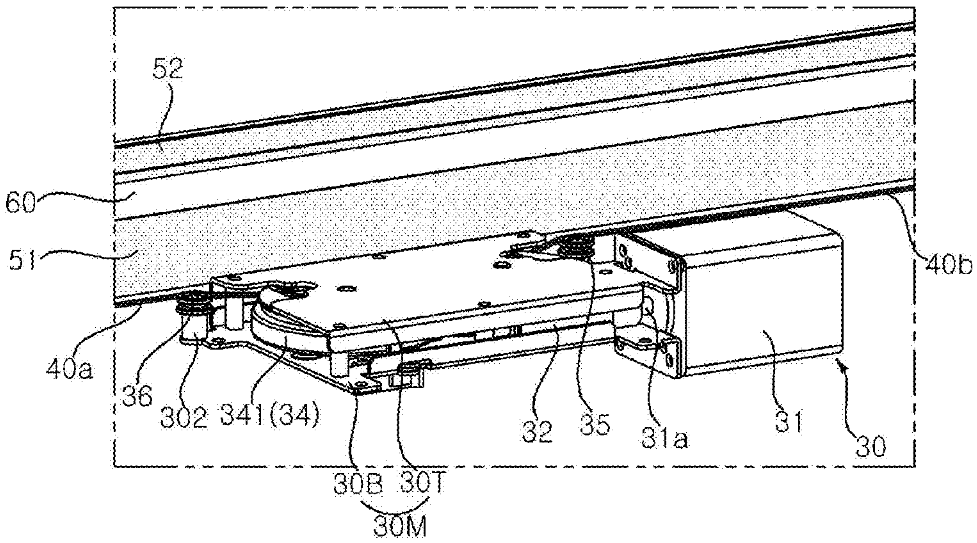

[FIG. 13]
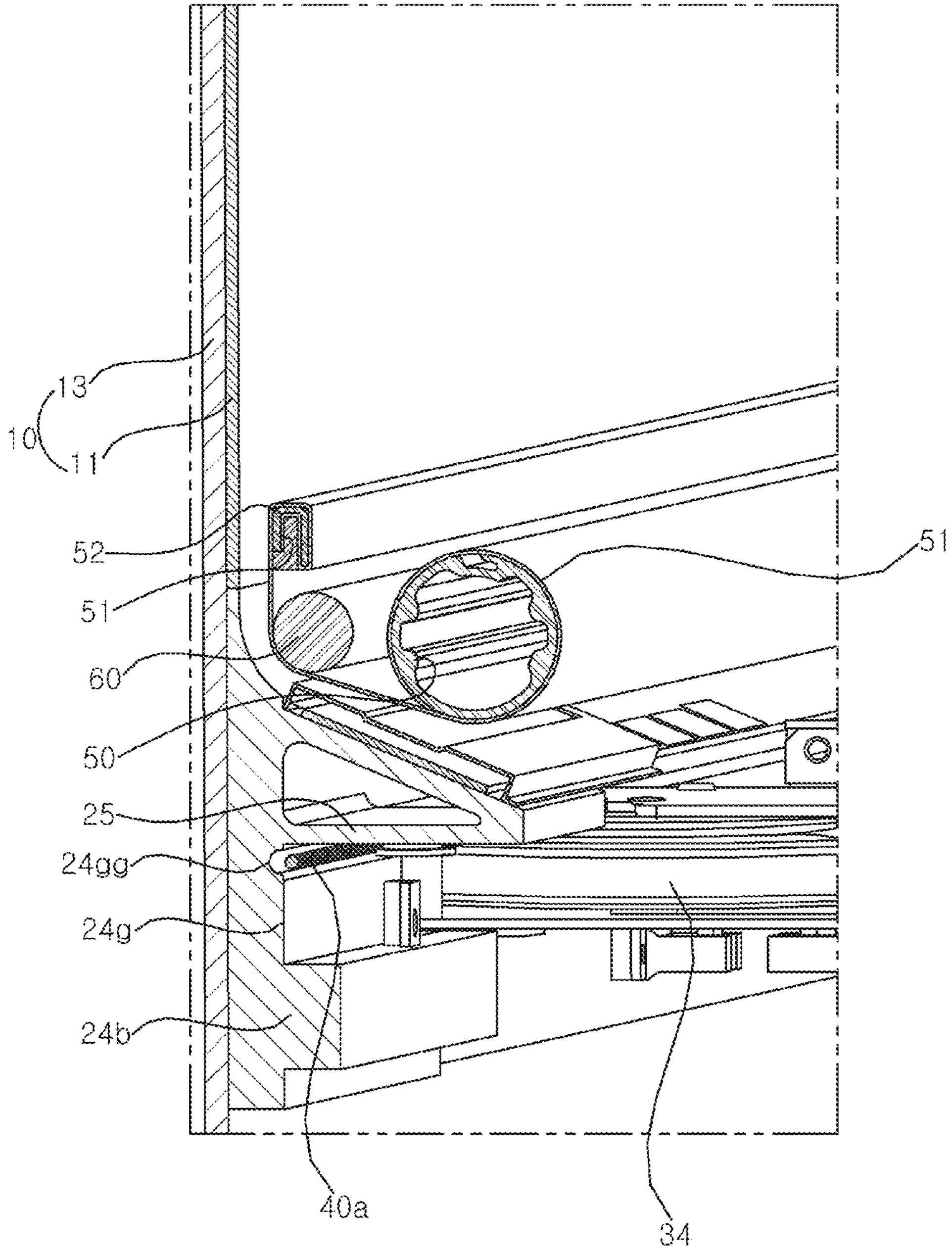

[FIG. 14]
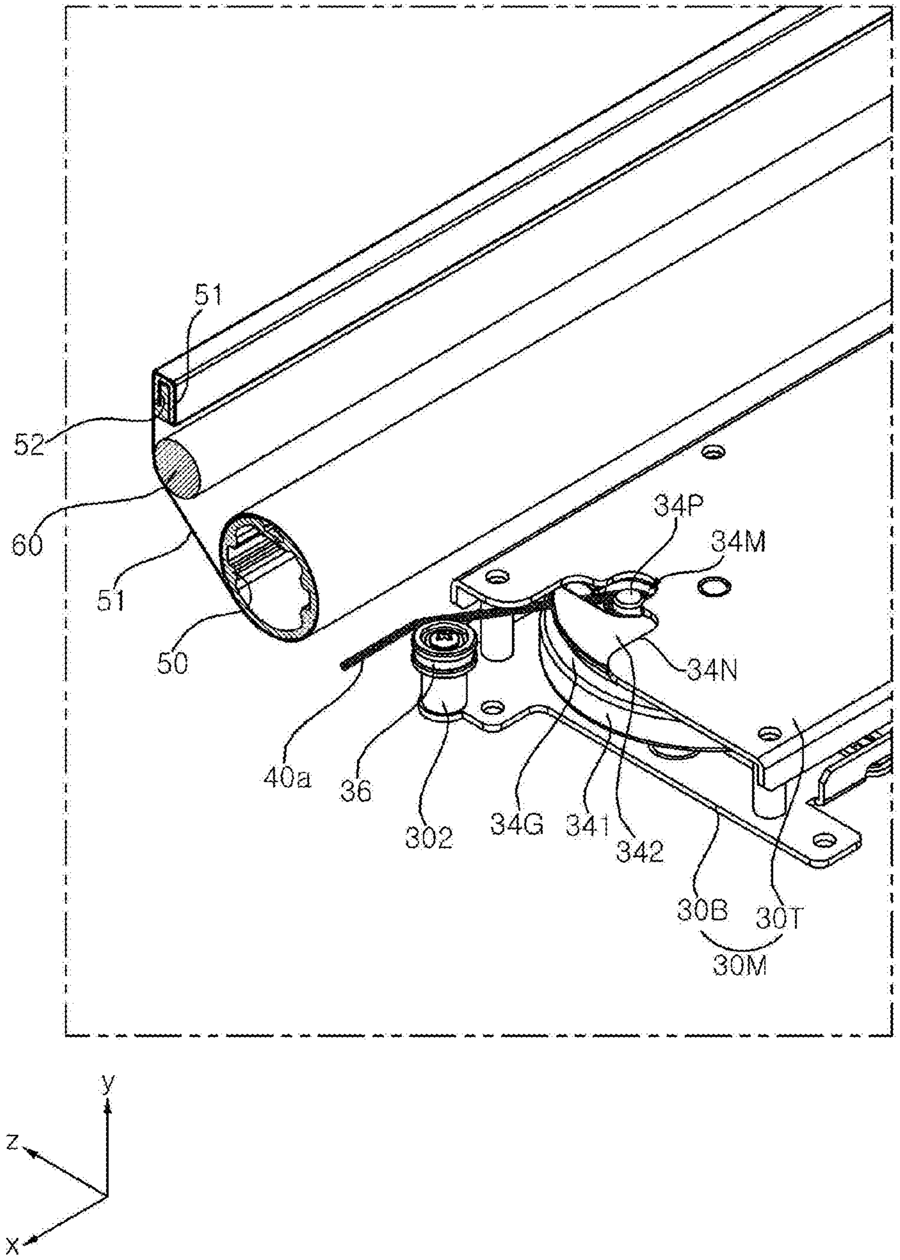

[FIG. 15]
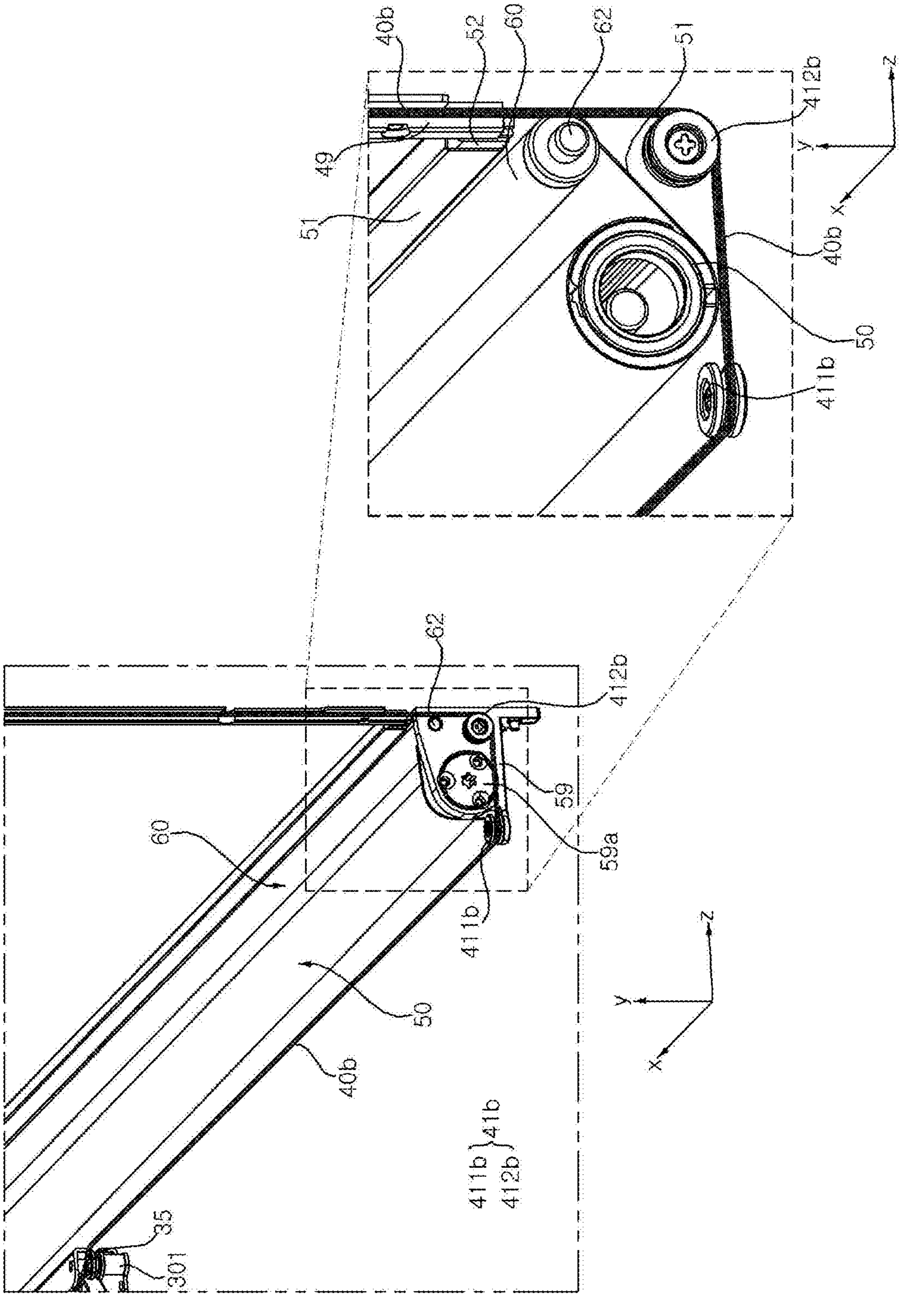

[FIG. 16]
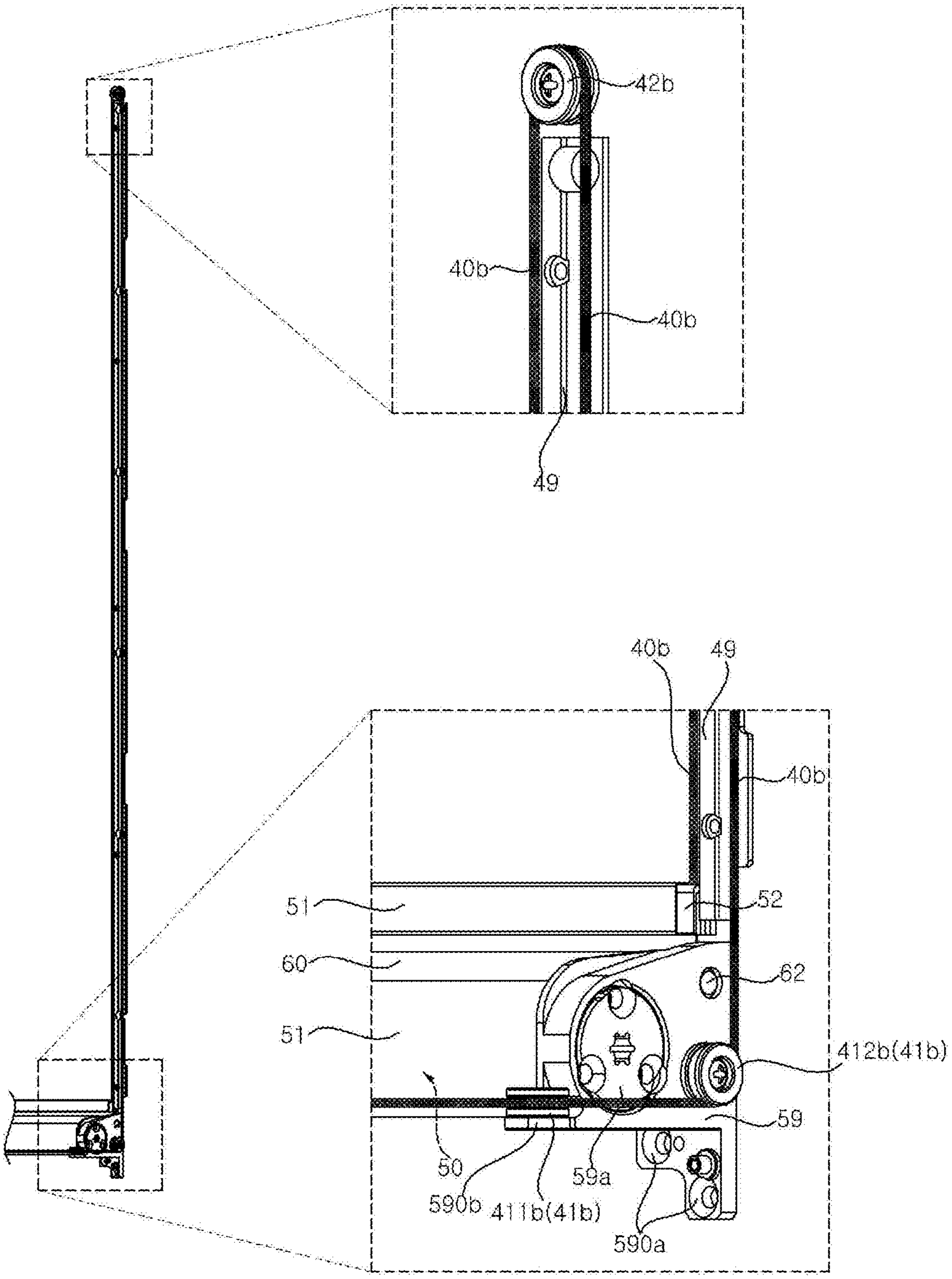

[FIG. 17]
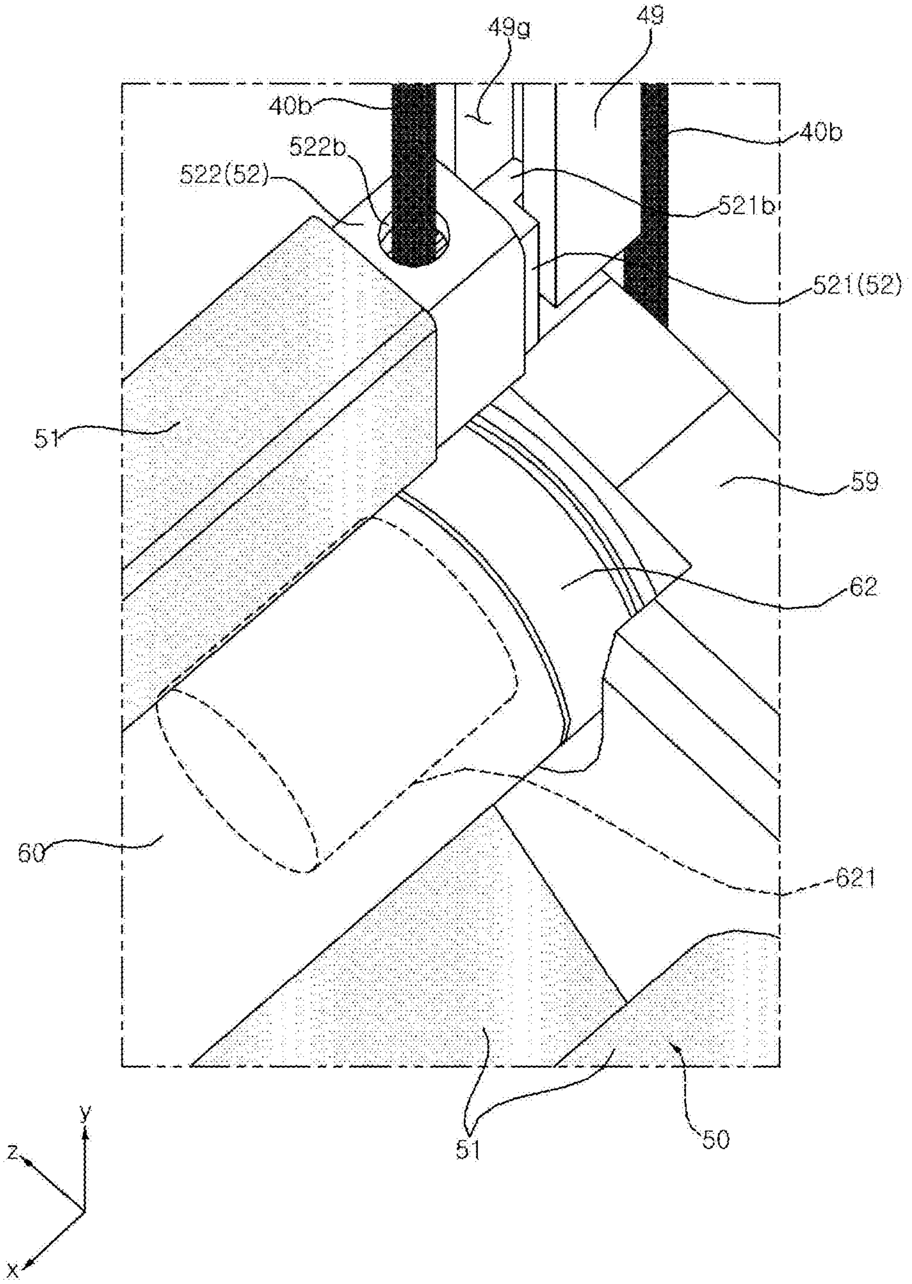

[FIG. 18]
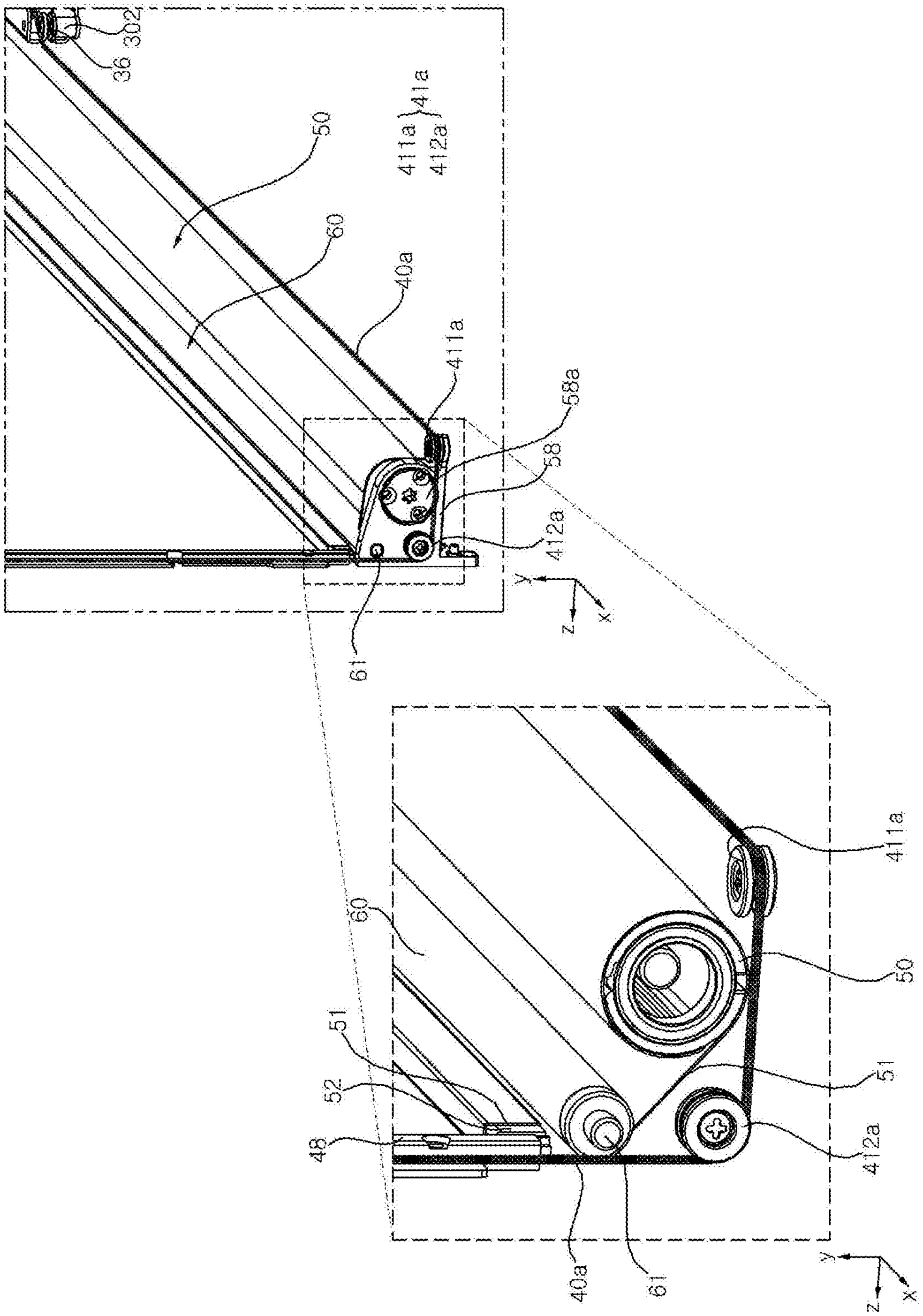

[FIG. 19]
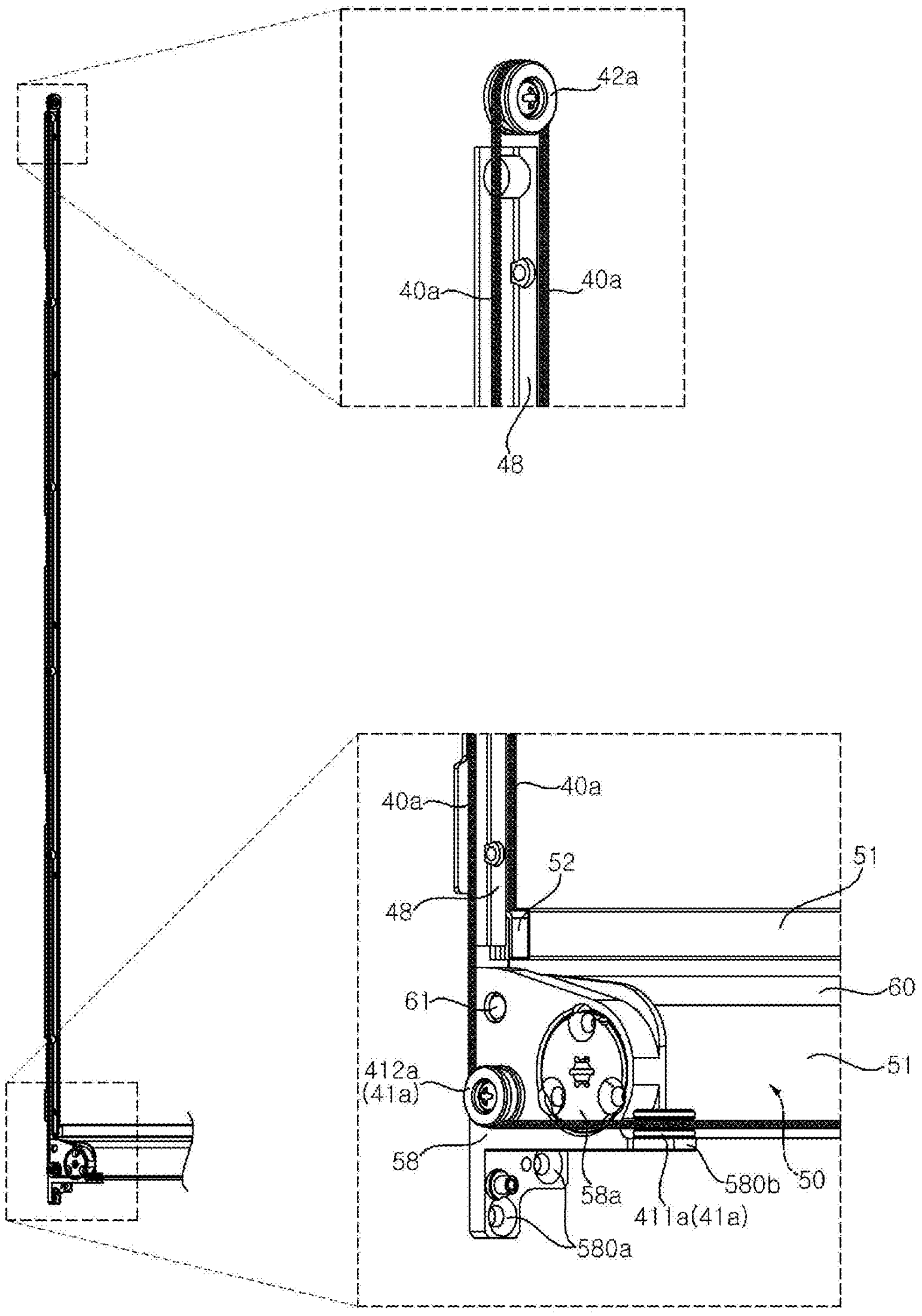

[FIG. 20]
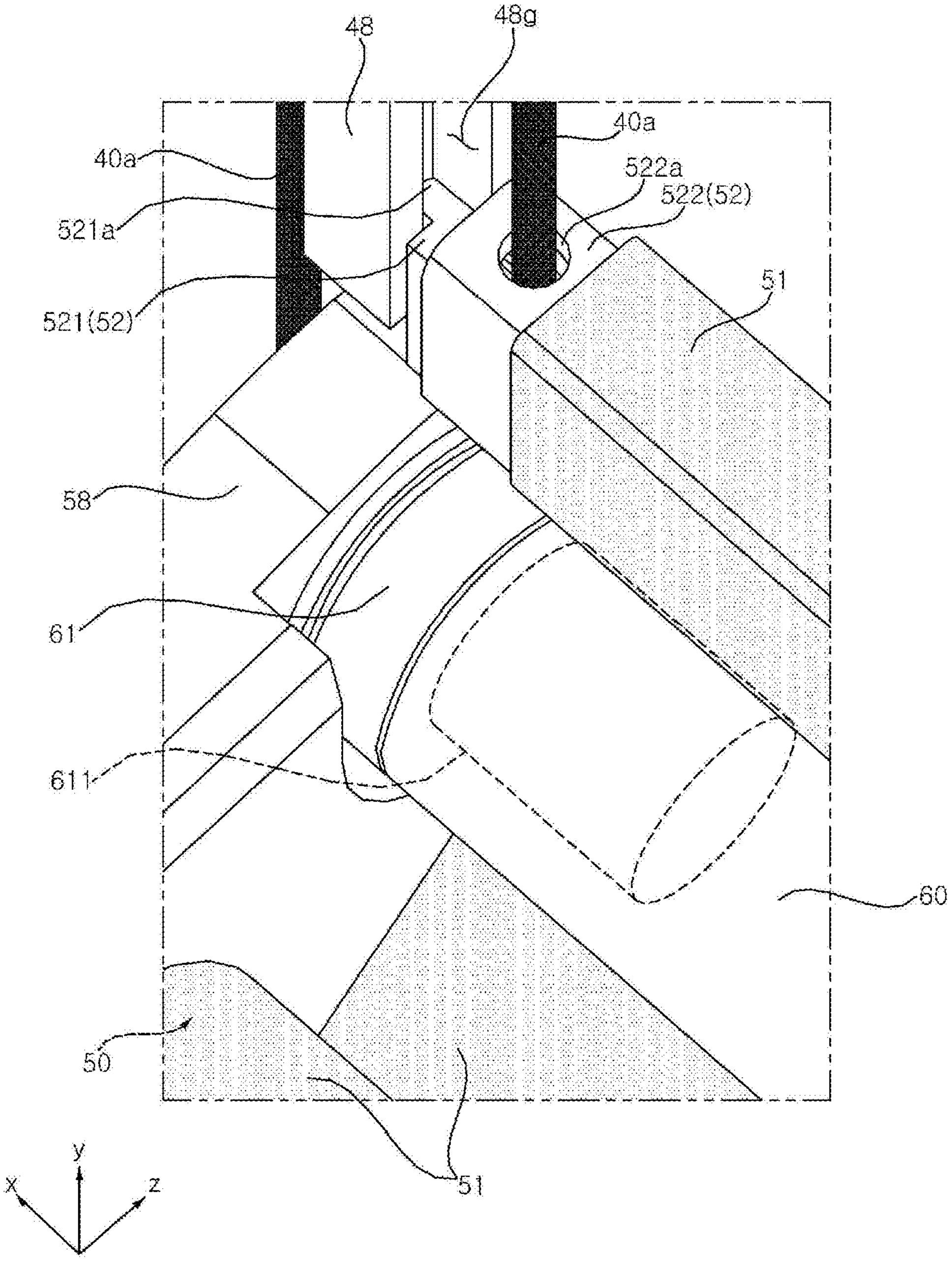

[FIG. 21]
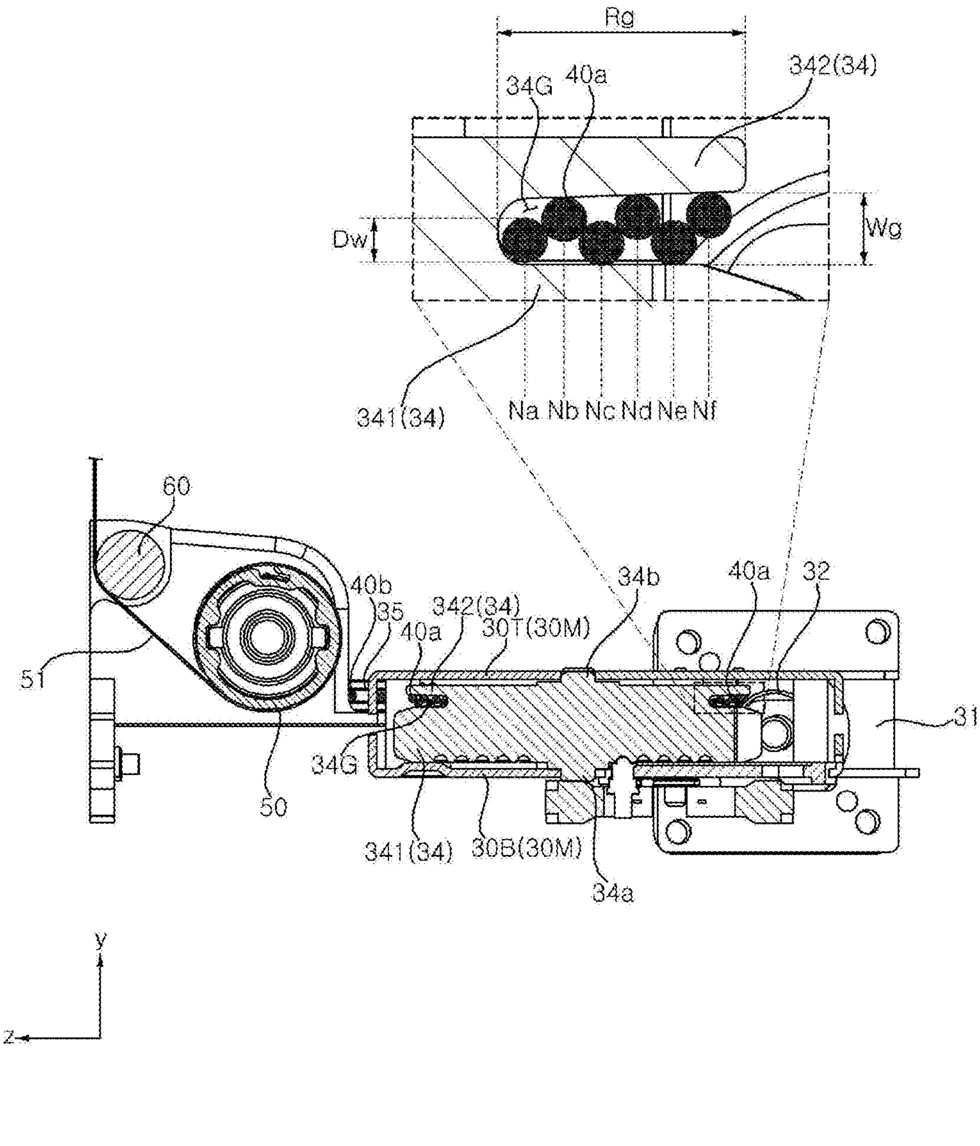

[FIG. 22]
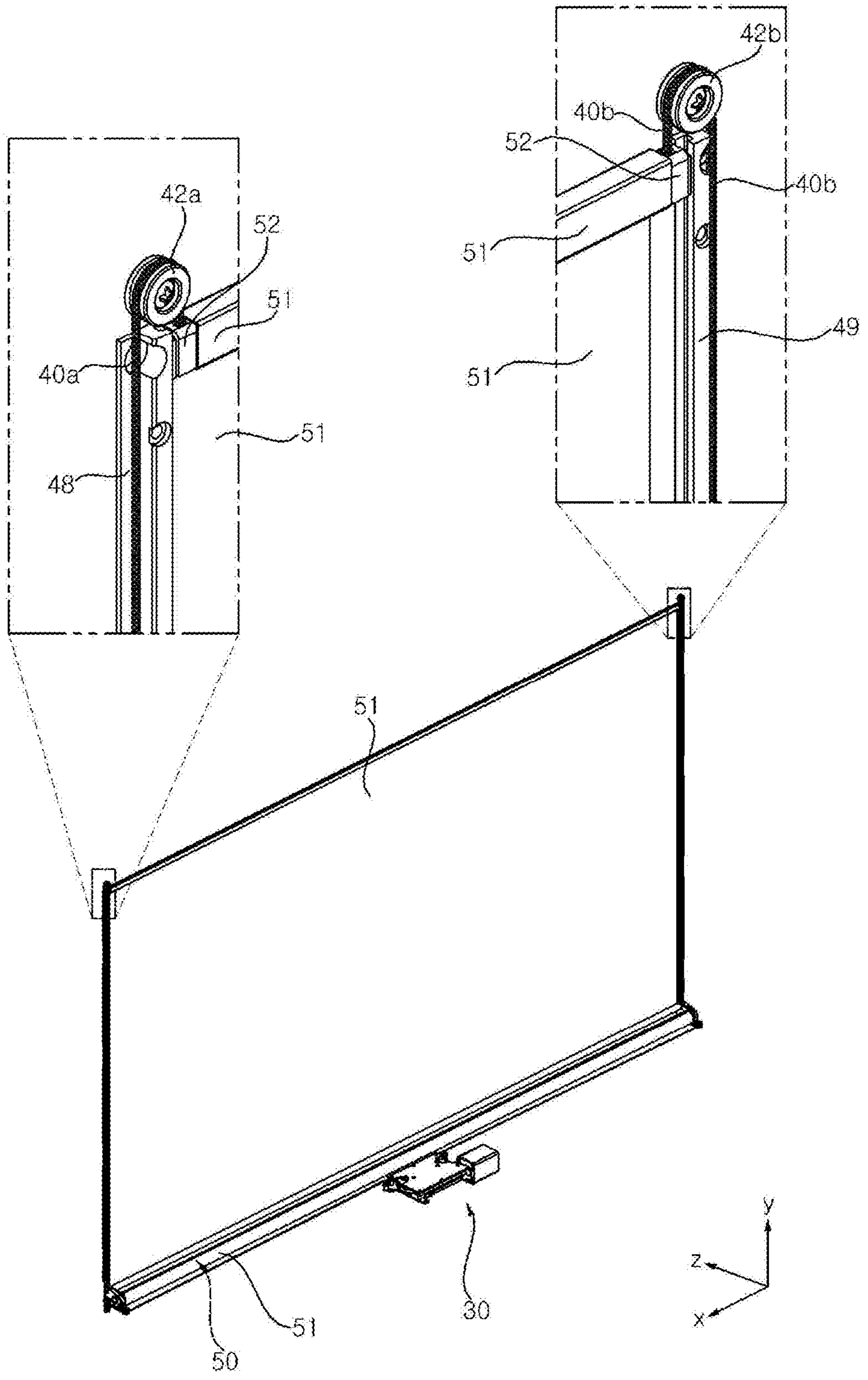

[FIG. 23]
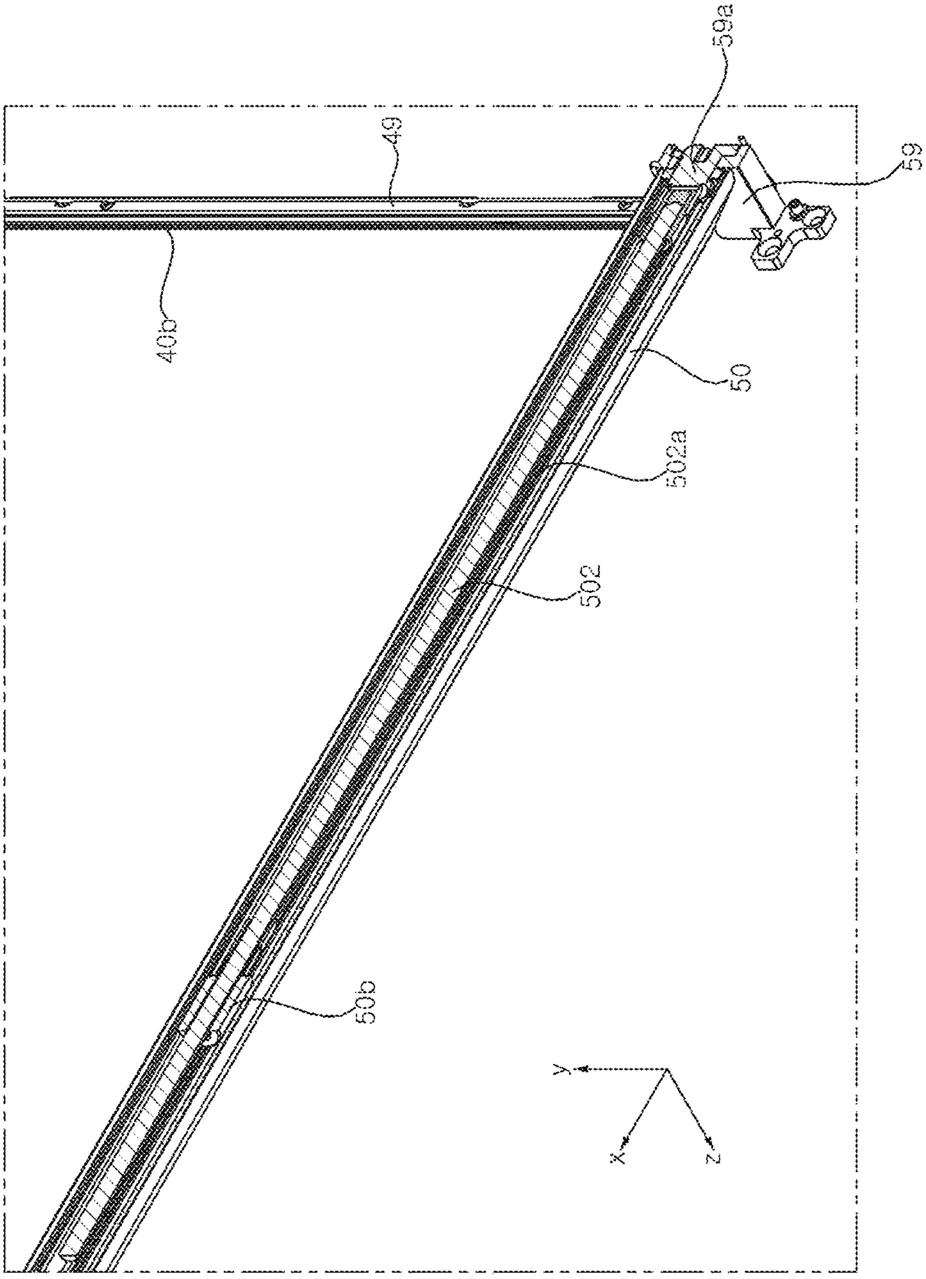

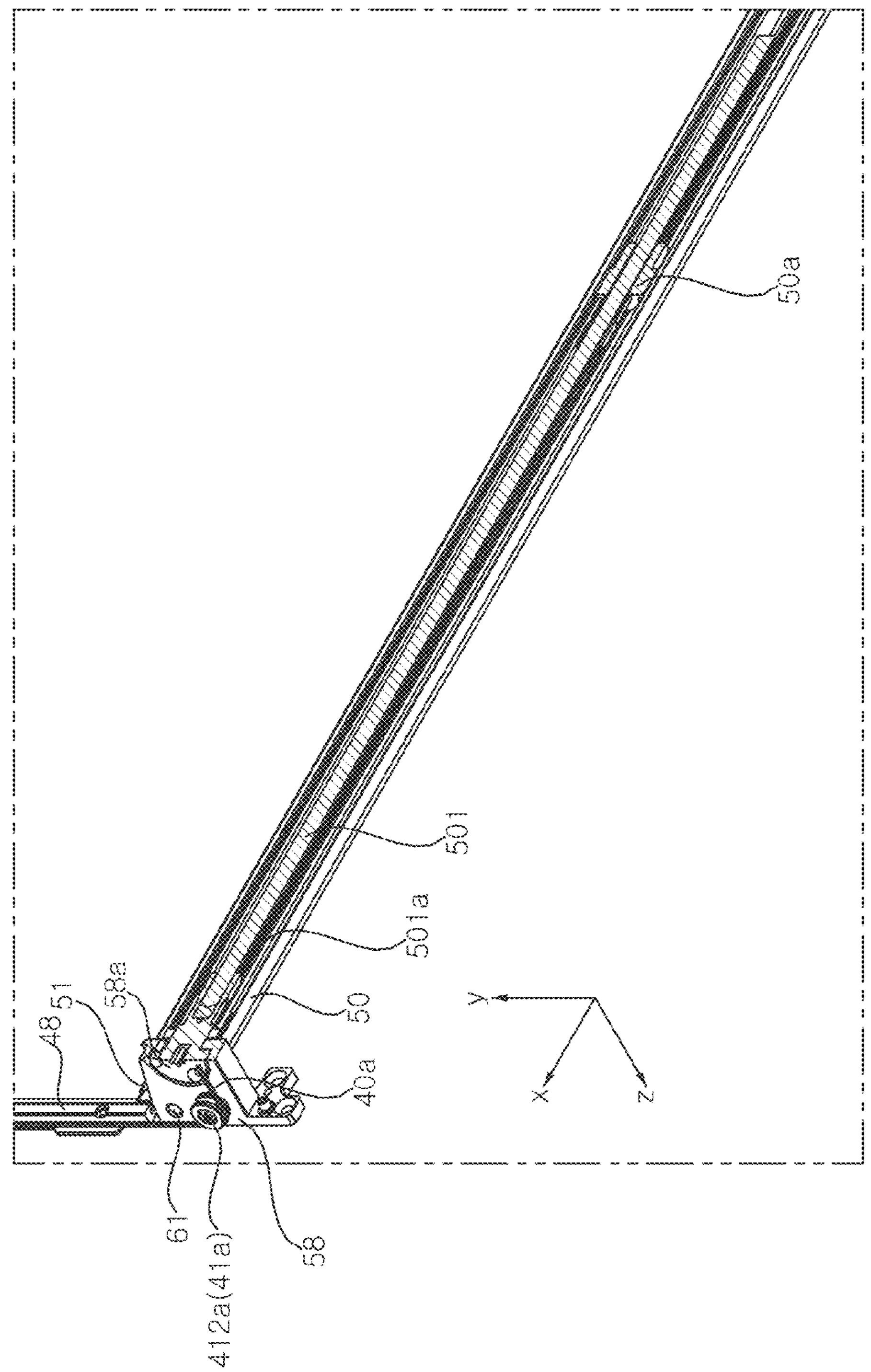
[FIG. 24]

[FIG. 25]
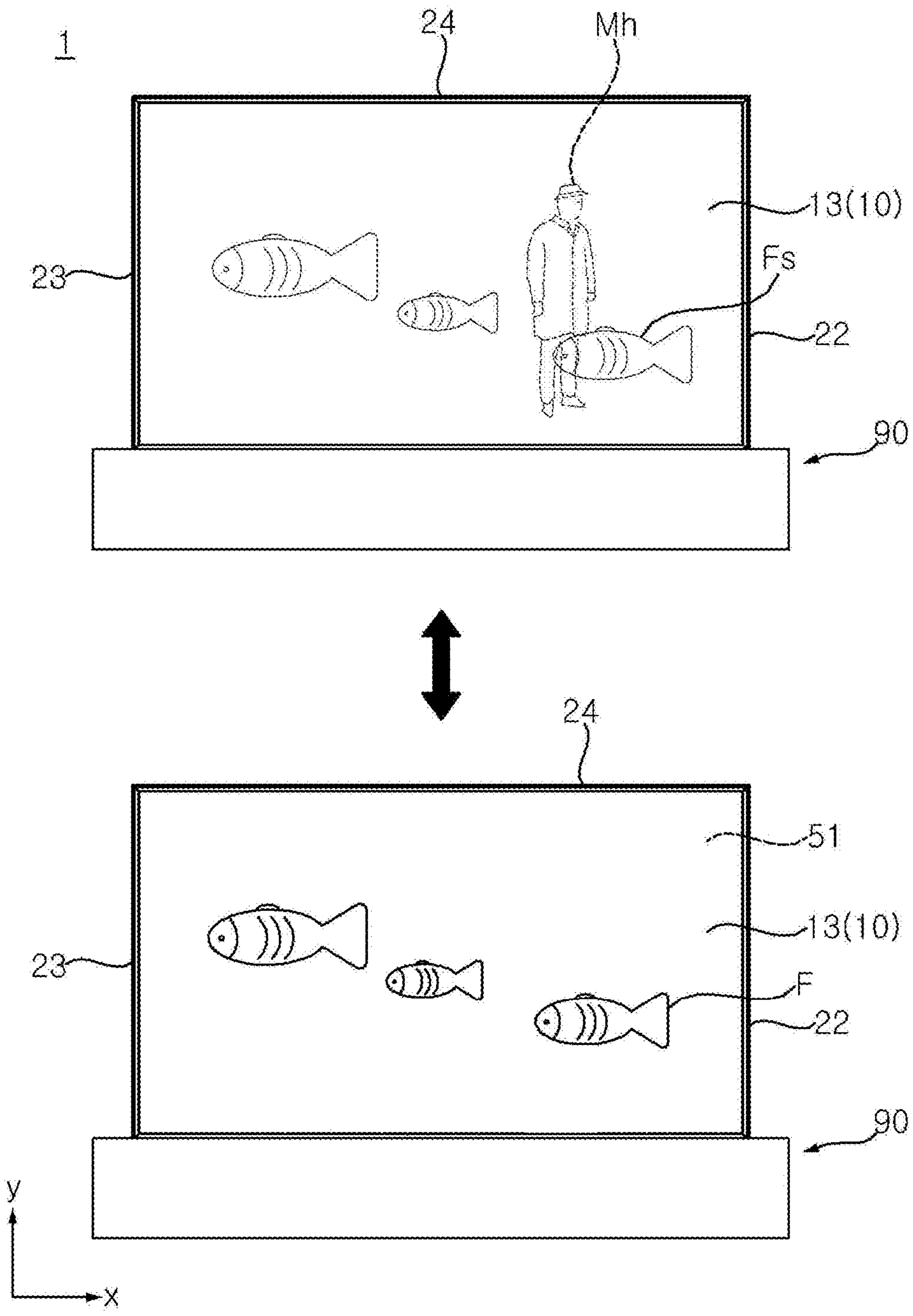

[FIG. 26]
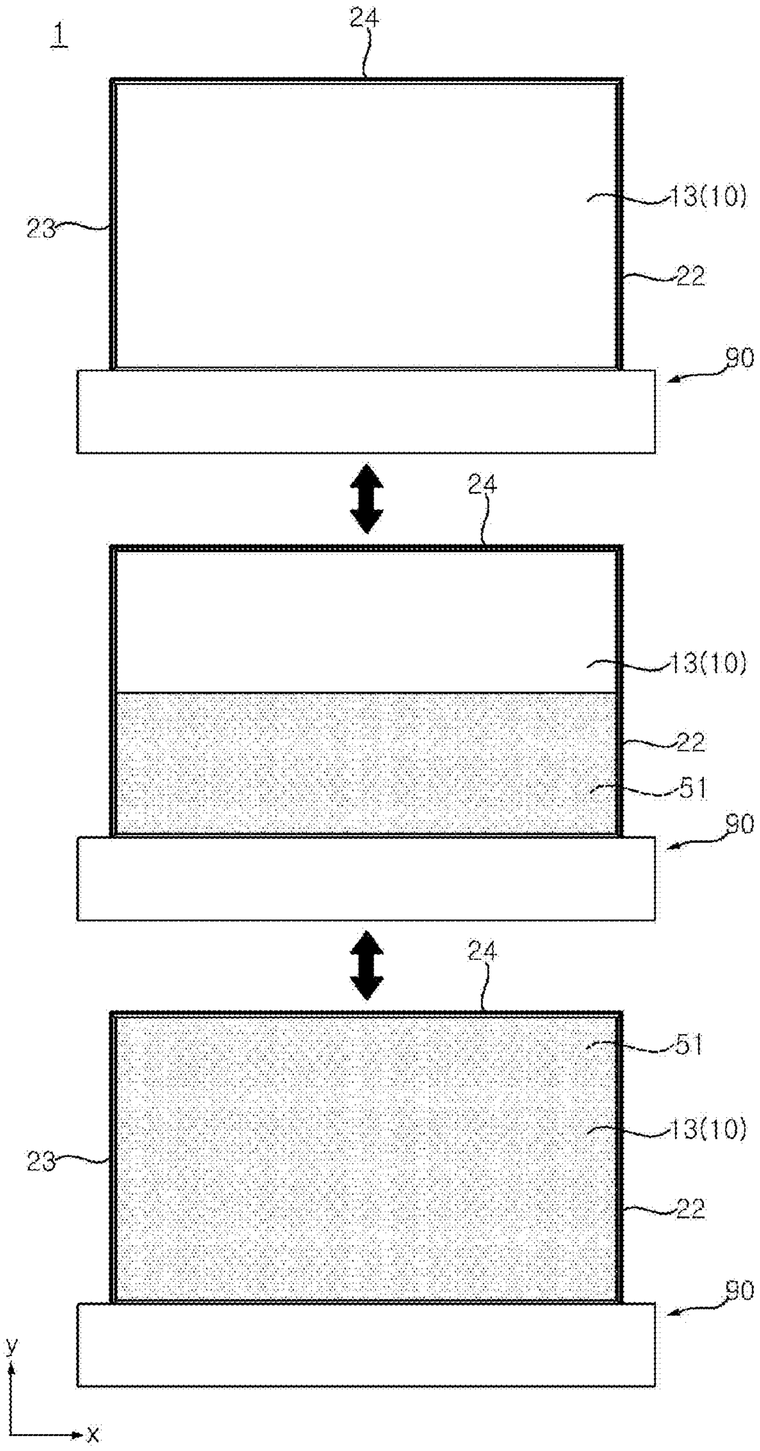

DISPLAY DEVICE

CROSS REFERENCE TO RELATED APPLICATIONS

This application is the National Phase of PCT/KR2022/007897 filed on Jun. 3, 2022, which is hereby expressly incorporated by reference into the present application.

TECHNICAL FIELD

The present disclosure relates to a display device. More particularly, the present disclosure relates to a display device including a transparent display panel.

BACKGROUND ART

With the development of information society, there has been a growing demand for various types of display devices. In order to meet such demand, various display devices, such as a liquid crystal display (LCD), a plasma display panel (PDP), an electro luminescent display (ELD), a vacuum fluorescent display (VFD), an organic light emitting diode (OLED) display, and the like, have been developed and used.

Among them, an LCD panel includes a TFT substrate and a color substrate that face each other with a liquid crystal layer interposed therebetween, so as to display an image using light provided from a backlight unit. Meanwhile, an OLED panel can display an image by depositing a self-luminescent organic layer on a substrate having a transparent electrode formed thereon.

Recently, numerous research has been conducted on a transparent display panel that allows a user not only to view an image displayed thereon but also to see what's behind the display panel.

DETAILED DESCRIPTION OF INVENTION

Technical Problems

It is an object of the present disclosure to solve the above and other problems.

Another object may be to provide a display device including a transparent display panel.

Another object may be to provide a structure for opening and closing the rear of a transparent display panel.

Another object may be to provide a structure that minimizes a cover for opening and closing the rear of a transparent display panel from being tilted to one side.

Technical Solution

In accordance with an aspect of the present disclosure for achieving the above and other objects, a display device may include: a display panel with translucency: a cover disposed at a rear of the display panel: a roller adjacent to one side of the display panel and extending along the one side, the roller around which the cover is wound or from which the cover is unwound; and a drive assembly which moves the cover in a direction away from or toward the one side of the display panel, wherein the drive assembly includes: a first wire adjacent to one end of the cover in a longitudinal direction of the roller, and fixed to the cover: a second wire adjacent to the other end of the cover in the longitudinal direction of the roller, and fixed to the cover; and a motor providing power to the first wire and the second wire.

Effect of Invention

The display device according to the present disclosure has the following effects.

According to at least one of the embodiments of the present disclosure, it is possible to provide a display device including a transparent display panel.

According to at least one of the embodiments of the present disclosure, it is possible to provide a structure for opening and closing the rear of a transparent display panel.

According to at least one of the embodiments of the present disclosure, it is possible to provide a structure that minimizes a cover for opening and closing the rear of a transparent display panel from being tilted to one side.

Further scope of applicability of the present disclosure will become apparent from the following detailed description. However, it should be understood that the detailed description and specific embodiments such as preferred embodiments of the present disclosure are given by way of example only, since various changes and modifications within the idea and scope of the present disclosure may be clearly understood by those skilled in the art.

BRIEF DESCRIPTION OF THE DRAWING

FIGS. 1 to 26 are diagrams illustrating examples of a display device according to embodiments of the present disclosure.

MODE FOR CARRYING OUT THE INVENTION

Description will now be given in detail according to exemplary embodiments disclosed herein, with reference to the accompanying drawings. For the sake of brief description with reference to the drawings, the same or equivalent components may be denoted by the same reference numbers, and description thereof will not be repeated.

In the following description, suffixes such as "module" and "unit" may be used to refer to elements or components. Use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to help easily understand the technical idea of the present disclosure and it should be understood that the idea of the present disclosure is not limited by the accompanying drawings. The idea of the present disclosure should be construed to extend to any alterations, equivalents, and substitutes besides the accompanying drawings.

Although the terms "first", "second", etc. may be used herein to describe various elements, these elements should not be limited by these terms. These terms are only used to distinguish one element from another.

It will be understood that when a component is referred to as being "connected to" or "coupled to" another component, it may be directly connected to or coupled to another component, or intervening components may be present. In contrast, when a component is referred to as being "directly connected to" or "directly coupled to" another component, there are no intervening components present.

As used herein, a singular representation is intended to include a plural representation unless the context clearly indicates otherwise.

It will be further understood that the terms "comprises or includes" and/or "has" when used in this specification, specify the presence of a stated feature, number, step, operation, component, element, or combination thereof, but do not preclude the presence or addition of one or more other features, numbers, steps, operations, components, elements, or combinations thereof.

The directions "up (U)", "down (D)", "left (Le)", "right (Ri)", "front (F)", and "rear (R)" shown in the drawings are only for the convenience of description, and the technical concept disclosed in this specification is not limited by these directions.

Referring to FIG. 1, a display device 1 may include a display 10, a side frame 20, and a housing 90. The display 10 may display an image. The side frame 20 may extend along a periphery of the display 10. The housing 90 may be positioned under the display 10 and the side frame 20. Alternatively, the housing 90 may be positioned at the top, left, or bottom of the display 10 and the side frame 20.

The display 10 may include a first long side LS1, a second long side LS2 opposite the first long side LS1, a first short side SS1 adjacent to the first long side LS1 and the second long side LS2, and a second short side SS2 opposite the first short side SS1. Meanwhile, for ease of explanation, it is illustrated and described that lengths of the first and second long sides LS1 and LS2 are greater than lengths of the first and second short sides SS1 and SS2, but the lengths of the first and second long sides LS1 and LS2 may be substantially equal to the lengths of the first and second short sides SS1 and SS2.

The long sides LS1 and LS2 and the short sides SS1 and SS2 of the display 10 may be formed on the side frame 20.

A direction parallel to the long sides LS1 and LS2 of the display 10 may be referred to as a left-and-right direction. A direction parallel to the short sides SS1 and SS2 of the display may be referred to as an up-and-down direction. A direction perpendicular to the long sides LS1 and LS2 and the short sides SS1 and SS2 of the display 10 may be referred to as a front-and-rear direction.

A direction in which the display 10 displays an image may be referred to as a front (F, z), and a direction opposite to the front may be referred to as a rear (R). The first short side SS1 may be referred to as a left side (Le, x). The second short side SS2 may be referred to as a right side (Ri). The first long side LS1 may be referred to as an upper side (U, y). The second long side LS2 may be referred to as a lower side (D).

Hereinafter, a display panel will be described using an organic light emitting diode (OLED) panel as an example, but the display panel applicable to the present disclosure is not limited to the OLED panel.

Referring to FIG. 2, a controller C of the display device 1 may control the operation of the display device 1. The controller C may be electrically connected to components of the display device 1.

A display panel 11, a main board 11*m*, a power supply board 11*p*, and a timing controller board 11*c* may be installed in an inner space of the housing 90 (see FIG. 1), and may be electrically connected to the controller C. The main board 11*m* may control the display device 1. The controller C may be configured as a main board 11*m* or may be a higher-level control unit that controls the main board 11*m* or the like. The power supply board 11*p* may provide power to each of the components of the display device 1. The timing controller board 11*c* may provide an image signal to the display panel 11.

A motor 31 of a drive assembly 30 may be electrically connected to the controller C. The controller C may control the operation of the motor 31, namely, the amount of rotation (rotation angle), rotational direction, and rotational speed. The motor 31 may be a step motor.

A speaker SPK may be installed in the inner space of the housing 90, and may be electrically connected to the controller C. A speaker hole (not shown) may be formed in the housing 90, and the speaker SPK may provide sound through the speaker hole.

A communication unit Cm may transmit information of the display device 1 to an external device, or may transmit various information or signals from an external device to the display device 1. The communication unit Cm may communicate with a remote control device, a portable terminal, a wired/wireless router, or other communication infrastructure (e.g., a server). For example, the communication unit Cm may perform wireless communication with an external device using a communication scheme such as IEEE 802.11 WLAN, IEEE 802.15 WPAN, UWB, Wi-Fi, Zigbee, Z-wave, Bluetooth, or the like.

A memory 11*r* may be electrically connected to the controller C. The memory 11*r* may store therein basic data regarding the display device 1 (e.g., basic specification information for each component of the display device such as display resolution, brightness, and sound output value), data and programs for controlling the operation of the display device 1, data input from the outside, data processed by the controller C, or the like. For example, the memory 11*r* may store information regarding the operation of the motor 31. For example, the memory 11*r* may include ROM, RAM, EPROM, a flash drive, a hard drive, or the like. For example, the memory 11*r* may be classified as a sub-component of the controller C.

Referring to FIG. 3, the display 10 may include a display panel 11, a first interface 11*a*, a second interface 11*b*, a timing controller 11*c*, a gate driver 11*d*, a data driver 11*e*, a memory 11*f*, a processor 11*g*, a power supply 11*h*, and a current detector 11*i*. The display panel 11 may be an organic light emitting diode (OLED) panel.

The first interface 11*a* may receive first direct current (DC) power V1 from a power supply outside the display 10, and the first DC power V1 may be provided for the operation of the power supply 11*h* and the timing controller 11*c*.

The second interface 11*b* may receive second DC power V2 from a power supply outside the display 10, and the second DC power V2 may be provided to the data driver 11*e*.

Based on an image signal Vd input to the first interface 11*a*, the timing controller 11*c* may output a data driving signal Sda and a gate driving signal Sga. For example, the first interface 11*a* may convert the image signal Vd to output a converted image signal Va1, and the timing controller 11*c* may output a data driving signal Sda and a gate driving signal Sga based on the converted image signal Va1. Such a data driving signal Sda may be a signal for driving subpixels of the display panel 11. The timing controller 11*c* may further output a control signal Cs to the data driver 11*e*.

In response to the gate driving signal Sga and the data driving signal Sda of the timing controller 11*c*, the gate driver 11*d* and the data driver 11*e* may provide a scan signal and an image signal to the display panel 11 through a gate line GL and a data line DL. Accordingly, the display panel 11 may display an image.

The power supply 11*h* may provide various types of power to the gate driver 11*d*, the data driver 11*e*, the timing controller 11*c*, etc.

The current detector 11*i* may detect current flowing through the subpixel of the display panel 11. The detected current may be input to the processor 11*g* for a cumulative current calculation. The calculated cumulative current may be stored in the memory 11*f*.

The processor 11*g* may perform various controls in the display 10. For example, the processor 11*g* may control the gate driver 11*d*, the data driver 11*e*, the timing controller 11*c*, and the like.

Referring to FIGS. 4 and 5, the display panel 11 may include a plurality of scan lines Scan 1 to Scan n and a plurality of data lines R1, G1, B1, W1 to Rm, Gm, Bm, Wm. The plurality of data lines R1, G1, B1, W1 to Rm, Gm, Bm, Wm may intersect the plurality of scan lines Scan 1 to Scan n. A subpixel may be defined in an intersecting area of the scan line and the data line. A pixel may be a hold-type element that continuously emits light in an organic light emitting layer OLED, after a scan signal is applied, during a unit frame period. For example, the pixel may include RGBW subpixels. As another example, the pixel may include RGB subpixels.

A subpixel circuit CRTm, which is an active type, may include a scan switching element SW1, a storage capacitor Cst, a drive switching element SW2, and an organic light emitting layer OLED.

The scan switching element SW1 may be turned on in response to a scan signal Vscan input from a scan line (Scan Line). When the scan switching element SW1 is turned on, the scan switching element SW1 may transmit a data signal Vdata input from a data line (Data Line) to one end of the storage capacitor Cst or a gate terminal of the drive switching element SW2.

The storage capacitor Cst may be provided between the gate terminal and the source terminal of the drive switching element SW2, and may store a difference between a data signal level transmitted to one end of the storage capacitor Cst and a DC power (VDD) level transmitted to the other end of the storage capacitor Cst.

For example, when the data signal has a different level according to a Plume Amplitude Modulation (PAM) method, the power level stored in the storage capacitor Cst may vary according to the level difference of the data signal Vdata. As another example, when the data signal has a different pulse width according to a Pulse Width Modulation (PWM) method, the power level stored in the storage capacitor Cst may vary according to the pulse width difference of the data signal Vdata.

The drive switching element SW2 may be turned on according to the power level stored in the storage capacitor Cst. When the drive switching element SW2 is turned on, a driving current IOLED, which is proportional to the stored power level, may flow in the organic light emitting layer OLED. Accordingly, the organic light emitting layer OLED may perform a light emitting operation.

The organic light emitting layer OLED may include an RGBW light emitting layer (EML) corresponding to subpixels, and may include at least one of a hole injection layer (HIL), a hole transport layer (HTL), an electron transport layer (ETL), and an electron injection layer (EIL). In addition, the organic light emitting layer OLED may include a hole blocking layer and the like.

In FIG. 5, it is illustrated that a p-type MOSFET is used for a scan switching element SW1 and a drive switching element SW2, but an n-type MOSFET or other switching elements, such as a JFET, an IGBT, SIC, or the like, may also be available.

Referring to FIG. 6, a pixel may include a light emitting region and a transparent region. RGBW (Red, Green, Blue, White) subpixels may be arranged vertically in the light emitting region, and the transparent region with no subpixels may be disposed next to the light emitting region.

Accordingly, the display panel 11 including a plurality of pixels may not only display an image, but also may allow light to pass therethrough. The display panel 11 may be referred to as a transparent display panel or a transparent OLED panel.

Referring to FIG. 7, a pixel may include a light emitting region and a transparent region. RGW (Red, Green, White) subpixels or BGW (Blue, Green, White) subpixels may be arranged adjacent to each other in the light emitting region, and the transparent region with no subpixels may be disposed next to the light emitting region.

Accordingly, the display panel 11 including a plurality of pixels may not only display an image, but also may allow light to pass therethrough. The display panel 11 may be referred to as a transparent display panel or a transparent OLED panel.

Referring to FIG. 8, the display panel 11 may include a plurality of pixels to output an image in accordance with color, brightness, and chroma of each pixel. The display panel 11 may be divided into an active area in which an image is displayed and a de-active area in which no image is displayed. The display panel 11 may generate light corresponding to red (R), green (G), or blue (B) color in response to a control signal.

A source PCB 14 may be adjacent to a lower side of the display panel 11 and may extend along the lower side. The source PCB 14 may be electrically connected to the display panel 11 through a source chip on film (COF) 15. The source PCB 14 may be electrically connected to the timing controller board 11*c* (see FIG. 2) through a cable (not shown) such as a flexible flat cable (FFC).

A transparent panel 13 may be disposed at the front of the display panel 11. The transparent panel 13 may be made of transparent glass. An adhesive film 12 may be disposed between the display panel 11 and the transparent panel 13, and may be coupled to the display panel 11 and the transparent panel 13. The adhesive film 12 may be an optically clear adhesive (OCA) film.

The adhesive film 12 may cover at least a portion of a rear surface of the transparent panel 13. For example, one side of the adhesive film 12 may be located closer to a center of the display 10 than one side of the transparent panel 13 that corresponds to the one side of the adhesive film 12. For example, upper, left, and right sides of the adhesive film 12 may be adjacent to upper, left and right sides of the transparent panel 13, respectively, and a lower side of the adhesive film 12 may be spaced upward from a lower side of the transparent panel 13.

In addition, the adhesive film 12 may have a size corresponding to a size of the display panel 11. For example, a diagonal length Db of the adhesive film 12 may be substantially equal to a diagonal length Da of the display panel 11. As another example, the diagonal length Db of the adhesive film 12 may be greater than the diagonal length Da of the display panel 11. In this case, a portion of the adhesive film 12 may be disposed at the outside of the display panel 11 along a periphery of the display panel 11.

Meanwhile, the display panel 11, the adhesive film 12, and the transparent panel 13 may be collectively referred to as the display 10.

Referring to FIG. 9, a frame 24 may be adjacent to the periphery of the display panel 11, and may extend along the periphery of the display panel 11. The frame 24 may be disposed at the rear of the adhesive film 12 on the outside the display panel 11, and may be coupled to the adhesive film 12.

A first frame 24*a* may extend along the upper side of the display panel 11, and may be disposed parallel to the upper side of the transparent panel 13.

A second frame 24*b* may extend along the lower side of the display panel 11, and may be spaced upward from the lower side of the transparent panel 13.

A third frame 24*c* may extend along the left side of the display panel 11, and may be disposed parallel to the left side of the transparent panel 13.

A fourth frame 24*d* may extend along the right side of the display panel 11, and may be disposed parallel to the right side of the transparent panel 13.

For example, the first frame 24*a*, the second frame 24*b*, the third frame 24*c*, and the fourth frame 24*d* may be formed as one body. As another example, the first frame 24*a*, the second frame 24*b*, the third frame 24*c*, and the fourth frame 24*d* may be detachably coupled to each other.

A roller 50 may be disposed at the rear of the frame 24. The roller 50 may extend along the second frame 24*b*. One end of the roller 50 may be adjacent to the third frame 24*c*, and may be coupled to the second frame 24*b* and/or the third frame 24*c*. The other end of the roller 50 may be adjacent to the fourth frame 24*d*, and may be coupled to the second frame 24*b* and/or the fourth frame 24*d*. Alternatively, the roller 50 may extend along the first frame 24*a*, the third frame 24*c*, or the fourth frame 24*d* so as to be coupled to the frame 24.

A cover 51 may be wound around or unwound from the roller 50. For example, the cover 51 may include a fabric material. For example, the cover 51 may be colored with black or another color. The cover 51 may be referred to as a blind, a jersey, or a shield.

A bracket 25 may protrude rearward from a portion of the frame 24 that corresponds to the roller 50, e.g., the second frame 24*b*. The bracket 25 may have a right triangular cross-section.

The drive assembly 30 may be adjacent to or in the vicinity of a central portion of the roller 50, and may be coupled to the second frame 24 and/or the bracket 25. The cover 51 may be unwound from the roller 50 by the power of the drive assembly 30.

Referring to FIGS. 10 and 11, the drive assembly 30 may include a motor 31, a worm 32, a first gear 33, a second gear 34, a first tension pulley 35, a second tension pulley 36, and a gear box (30B, 30T).

A base 30B may define a bottom of the gear box (30B, 30T). A top cover 30T may define a top of the gear box (30B, 30T), and may be coupled to the base 30B.

The motor 31 may be coupled to a lateral side of the base 30B in a longitudinal direction of the roller 50 (see FIG. 9). The motor 31 may provide torque. The motor 31 may be an electric motor whose rotational direction, rotation angle, and rotational speed are adjustable, and may have a rotating shaft 31*a* parallel to the longitudinal direction of the roller 50.

The worm 32 may be disposed between the base 30B and the top cover 30T. One end of the worm 32 may be fixed to the rotating shaft 31*a* of the motor 31, and the other end of the worm 32 may be rotatably coupled to a protruding portion (no reference numeral) that protrudes from an upper surface of the base 30B toward the top cover 30T. A portion of the worm 32 may be disposed in a hole 30Ms formed in the base 30B. Screw-shaped gear teeth may be formed on an outer circumferential surface of the worm 32. The worm 32 may be referred to as a worm shaft.

The first gear 33 may be disposed between the base 30B and the top cover 30T. The first gear 33 may have a generally flat cylindrical shape. A first lower pin 33*a* may protrude downward from a lower surface of the first gear 33, and may be rotatably inserted into a first lower hole 30Ma formed in the base 30B. A first upper pin 33*b* may protrude upward from an upper surface of the first gear 33, and may be rotatably inserted into a first upper hole 30Ta formed in the top cover 30T.

In addition, the first gear 33 may mesh with the thread formed on the outer circumferential surface of the worm 32. A rotation axis of the first gear 33 may be perpendicular to a rotation axis of the worm 32, and may pass through the first lower pin 33*a* and the first upper pin 33*b*. The first gear 33 may be referred to as a drive gear 33, a drive pulley 33, a first wire reel 33, or a worm wheel 33. The first gear 33 may be a helical gear.

A first groove 33G may be formed around an outer circumferential surface of the first gear 33, and may extend in a circumferential direction of the first gear 33. A first lower part 331 may be positioned under the first groove 33G, and a first upper part 332 may be positioned over the first groove 33G. Gear teeth of the first gear 33 may be formed on an outer circumferential surface of the first lower part 331 and/or an outer circumferential surface of the first upper part 332.

A first pin base 33M may be formed by being recessed from a portion of an inner lateral side of the first groove 33G toward a center of the first gear 33. A first pin 33P may protrude from a bottom side of the first pin base 33M toward the top cover 30T, and a lateral side of the first pin base 33M may surround a portion of a lateral side of the first pin 33P. A first cut-out 33N may be formed by cutting out a portion of an outer circumference of the first upper part 332, and may be positioned to correspond to the first pin 33P.

The first tension pulley 35 may be rotatably coupled to or fixed to a first supporter 301 that protrudes upward from the base 30B. A rotation axis of the first tension pulley 35 may be parallel to the rotation axis of the first gear 33. A distance between the rotation axis of the first tension pulley 35 and the rotation axis of the first gear 33 may be greater than a radius of the first gear 33. That is, the first tension pulley 35 may be spaced apart from the first gear 33 in a radial direction of the first gear 33.

One end of a first wire 40*b* may be fixed to the first pin 33P, and the other end of the first wire 40*b* may be fixed to a bar 52 (see FIG. 16). A portion of the first wire 40*b* may be disposed in the first groove 33G. The first wire 40*b* may be engaged with an outer circumference of the first tension pulley 35 and may be bent by the first tension pulley 35.

The second gear 34 may be disposed between the base 30B and the top cover 30T. The second gear 34 may have a generally flat cylindrical shape. A second lower pin 34*a* may protrude downward from a lower surface of the second gear 34, and may be rotatably inserted into a second lower hole 30Mb formed in the base 30B. A second upper pin 34*b* may protrude upward from an upper surface of the second gear 34, and may be rotatably inserted into a second upper hole 30Tb formed in the top cover 30T.

In the radial direction of the first gear 33, the second gear 34 may be in mesh with the first gear 33. A rotation axis of the second gear 34 may be parallel to the rotation axis of the first gear 33, and may pass through the second lower pin 34*a* and the second upper pin 34*b*. The second gear 34 may be referred to as a driven gear 34, a driven pulley 34, or a second wire reel 34. The second gear 34 may be a helical gear.

A second groove 34G may be formed around an outer circumferential surface of the second gear 34, and may extend in a circumferential direction of the second gear 34. A second lower part 341 may be positioned under the second groove 34G, and a second upper part 342 may be positioned over the second groove 34G. Gear teeth of the second gear 34 may be formed on an outer circumferential surface of the second lower part 341 and/or an outer circumferential surface of the second upper part 342.

A second pin base 34M may be formed by being recessed from a portion of an inner lateral side of the second groove 34G toward a center of the second gear 34. A second pin 34P may protrude from a bottom side of the second pin base 34M toward the top cover 30T, and a lateral side of the second pin base 34M may surround a portion of a lateral side of the second pin 34P. A second cut-out 34N may be formed by cutting out a portion of an outer circumference of the second upper part 342, and may be positioned to correspond to the second pin 34P.

The second tension pulley 36 may be rotatably coupled to or fixed to a second supporter 302 that protrudes upward from the base 30B. A rotation axis of the second tension pulley 36 may be parallel to the rotation axis of the second gear 34. A distance between the rotation axis of the second tension pulley 36 and the rotation axis of the second gear 34 may be greater than a radius of the second gear 34. That is, the second tension pulley 36 may be spaced apart from the second gear 34 in a radial direction of the second gear 34.

One end of a second wire 40*a* may be fixed to the second pin 34P, and the other end of the second wire 40*a* may be fixed to the bar 52 (see FIG. 19). A portion of the second wire 40*a* may be disposed in the second groove 34G. The second wire 40*a* may be engaged with an outer circumference of the second tension pulley 36 and may be bent by the second tension pulley 36.

The first wire 40*b* bent by the first tension pulley 35 may extend in a first direction parallel to the longitudinal direction of the roller 50 (see FIG. 9). The second wire 40*a* bent by the second tension pulley 36 may extend in a second direction opposite to the first direction. In other words, the first pin 33P and the first tension pulley 35 may be symmetric to the second pin 34P and the second tension pulley 36 with respect to a contact point between the first gear 3 and the second gear 34.

Referring to FIGS. 12 and 13, the gears 32, 33, and 34 described above may be accommodated in a gear box 30M. The motor 31 may be coupled to a lateral side of the gear box 30M.

The gear box 30M may be adjacent to the roller 50, and may be installed at the second frame 24*b*. For example, the bracket 25 may be provided on a rear surface of the second frame 24*b*, and may have an insertion groove 24*g*. A portion of the gear box 30M may be inserted into the insertion groove 24*g*, and may be detachably coupled to the second frame 24*b* and/or the bracket 25. A portion of the gear box 30M may overlap the bracket 25 and the roller 50 in the vertical direction. The first wire 40*b* and the second wire 40*a* may be placed in a wire groove 24*gg* formed in the insertion groove 24*g*.

Referring to FIG. 14, the gear box 30M may be positioned behind the roller 50, and may be spaced apart from the roller 50 in a radial direction of the roller 50. The gear box 30M may be detachably coupled to the inside of the housing 90 (see FIG. 1) and/or the second frame 24*b*. The gear box 30M may not overlap the roller 50 in the vertical direction. The first wire 40*b* and the second wire 40*a* may be disposed at the rear of the roller 50.

Referring back to FIGS. 13 and 14, the roller 50 may have a generally hollow cylindrical shape. The bar 52 may be spaced apart from the roller 50 in the radial direction of the roller 50, and may extend in the longitudinal direction of the roller 50. The bar 52 may be disposed at the rear of the display 10, and may be located closer to the display 10 than the roller 50. The bar 52 may be referred to as a pole 52.

One end (or a first end) of the cover 51 may be fixed to the roller 50, and the other end (or a second end) of the cover 51 may be fixed to the bar 52. For example, the bar 52 may have a hook-shaped longitudinal section, and a portion of the cover 51 may cover or wrap the bar 52. Here, the portion of the cover 51 may be attached to the bar 52 by an adhesive member, thermally bonded, or fixed to the bar 52 by a screw or the like.

An auxiliary roller 60 may have a generally solid cylindrical or hollow cylindrical shape. The auxiliary roller 60 may extend in the longitudinal direction of the roller 50, and a radius of the auxiliary roller 60 may be less than a radius of the roller 51. The auxiliary roller 60 may be spaced apart from the roller 50 in the radial direction of the roller 50, and may be positioned below the bar 52. For example, an imaginary vertical line passing through a front end of the bar 52 (or a straight line slightly offset from the vertical line) may contact an outer circumference of the auxiliary roller 60.

Accordingly, the cover 51 may be engaged with the auxiliary roller 60, and may be bent by the auxiliary roller 60.

A first portion of the cover 51 may be a portion of the cover 51 wound around the roller 50. A second portion of the cover 51 may be connected to the first portion, one end of the second portion may be in contact with an outer circumference of the roller 50, and the other end of the second portion may be in contact with the outer circumference of the auxiliary roller 60. A vertical segment of the second portion, a line segment connecting a center of the roller 50 and a center of the auxiliary roller 60, a line segment connecting the center of the roller 50 and one end of the first portion, and a line segment connecting the center of the auxiliary roller 60 and the other end of the first portion may define a trapezoid. A third portion of the cover 51 may be connected to the second portion, and may be a portion of the cover 51 wound on the auxiliary roller 60. A fourth portion of the cover 51 may be connected to the third portion, one end of the fourth portion may be in contact with the outer circumference of the auxiliary roller 60, and the other end of the fourth portion may be in contact with the bar 52. A vertical segment of the fourth portion may be parallel to the vertical direction or may be slightly offset from the vertical direction. A fifth portion of the cover 51 may be connected to the fourth portion and may be a portion of the cover 51 that covers the bar 52.

Referring to FIGS. 15 and 16, a first mount 59 may extend in a direction intersecting the roller 50, and may be adjacent to a first end (e.g., a right end) of the second frame 24*b*. A fastening member such as a screw may pass through a hole 590*a* formed in the first mount 59 to be fastened to a rear side of the second frame 24*b*. Accordingly, the first mount 59 may be coupled to the second frame 24*b*.

A first guide frame 49 may extend vertically above the first mount 59, and may be adjacent to a first end (e.g., a right end) of the bar 52. A fastening member such as a screw may pass through a hole (no reference numeral) formed in the first guide frame 49 to be fastened to a rear side of the fourth frame 24*d*. Accordingly, the first guide frame 49 may be coupled to the fourth frame 24*d*.

In the longitudinal direction of the roller 50, the first mount 59 may be located at the end of the roller 50. In the longitudinal direction of the roller 50, a first end (e.g., a right end) of the roller 50 may be connected to the first mount 59. A first cap 59*a* may be coupled to an outer surface of the first mount 59 by a fastening member such as a screw, and a portion of the first cap 59*a* may be inserted into the roller 50.

In a longitudinal direction of the auxiliary roller 60, the first mount 59 may be located at the end of the auxiliary roller 60. In the longitudinal direction of the auxiliary roller 60, a first end (e.g., a right end) of the auxiliary roller 60 may be connected to the first mount 59. The first end of the auxiliary roller 60 may be referred to as a first insertion portion 62, and the first insertion portion 62 may be inserted into or pass through the first mount 59.

For example, a portion of the first wire 40*b* parallel to the longitudinal direction of the roller 50 may be spaced apart from the roller 50 in the radial direction of the roller 50, and may be located rearward relative to the roller 50 (see FIG. 15).

In this case, a first guide pulley 41*b* may be rotatably coupled to the first mount 59. Alternatively, the first guide pulley 41*b* may be fixed to the first mount 59.

A first rear pulley 411*b* may be adjacent to a rear end of the first mount 59, and may be rotatably coupled to the first mount 59 in the vertical direction. A rotation axis of the first rear pulley 411*b* may be parallel to the rotation axis of the first tension pulley 35. The first rear pulley 411*b* may be spaced apart from the first tension pulley 35 in the longitudinal direction of the roller 50, the first rear pulley 411*b* may be located substantially at the same position as the first tension pulley 35 in the vertical direction, and the first rear pulley 411*b* may be located forward relative to the first tension pulley 35.

A first front pulley 412*b* may be adjacent to a front end of the first mount 59, and may be rotatably coupled to an outer surface of the first mount 59 in the horizontal direction. A rotation axis of the first front pulley 412*b* may be parallel to the longitudinal direction of the roller 50. The roller 50 may be positioned between the first rear pulley 411*b* and the first front pulley 412*b* in the front-and-rear direction, the first front pulley 412*b* may be located at a higher position than the first rear roller 411*b* in the vertical direction, and the first front pulley 412*b* may be spaced downward from the auxiliary roller 60.

A first upper pulley 42*b* may be disposed opposite the first mount 59 with respect to the first guide frame 49. The first upper pulley 42*b* may be positioned at or adjacent to a corner where the first frame 24*a* and the fourth frame 24*d* meet, and may be rotatably coupled to or fixed to the first frame 24*a* and/or the fourth frame 24*d*. A rotation axis of the first upper pulley 42*b* may be parallel to the front-and-rear direction. The first upper pulley 42*b* may be located leftward relative to the first front pulley 412*b*.

The first wire 40*b* may be engaged with the outer circumference of the first tension pulley 35, and may be bent by the first tension pulley 35. The first wire 40*b* may extend in the longitudinal direction of the roller 50 between the first tension pulley 35 and the first rear pulley 411*b*. The first wire 40*b* may be engaged with an outer circumference of the first rear pulley 411*b*, and may be bent 90 degrees with respect to the y-axis by the first rear pulley 411*b*. The first wire 40*b* may extend in the front-and-rear direction between the first rear pulley 411*b* and the first front pulley 412*b*. The first wire 40*b* may be engaged with an outer circumference of the first front pulley 412*b*, and may be bent 90 degrees with respect to the x-axis by the first front pulley 412*b*. The first wire 40*b* may extend in the vertical direction between the first front pulley 412*b* and the first upper pulley 42*b*. The first wire 40*b* may be engaged with an outer circumference of the first upper pulley 42*b*, and may be bent 180 degrees with respect to the z-axis by the first upper pulley 42*b*. Between the first front pulley 412*b* and the first upper pulley 42*b*, the first wire 40*b* may extend in the vertical direction on the right side of the first guide frame 49, and the first wire 40*b* may extend in the vertical direction on the left side of the first guide frame 49.

As another example, a portion of the first wire 40*b* parallel to the longitudinal direction of the roller 50 may be spaced apart from the roller 50 in the radial direction of the roller 50, and may be located forward relative to the roller 50 (see FIGS. 12 and 13).

In this case, a first guide pulley (not shown) may be coupled to the second frame 24*b*. The first guide pulley and a second guide pulley 41*a*, which will be described later with reference to FIG. 9, may be left-right symmetric.

Referring to FIG. 17, the bar 52 may include an inner bar 521 and an outer bar 522. The inner bar 521 may extend in the longitudinal direction of the roller 50, and may generally have the shape of a solid square lumber. The outer bar 522 may extend along the inner bar 521, may generally have the shape of a C-shaped beam, and may cover the inner bar 521.

A first wire hole 522*b* may be adjacent to a first end (e.g., a right end) of the outer bar 522, and may be formed through an upper surface of the outer bar 522. An end of the first wire 40*b* may pass through the first wire hole 522*b*, and may be fixed to the outer bar 522 and/or the inner bar 521.

A first guide protrusion 521*b* may protrude rightward from a first end (e.g., a right end) of the inner bar 521. The first guide protrusion 521*b* may define a first end (e.g., a right end) of the bar 52.

A first guide groove 49*g* may be formed in a left side or surface of the first guide frame 49, and may extend vertically. The first guide protrusion 521*b* may be inserted into the first guide groove 49*g* so as to be movable in the vertical direction.

Accordingly, the bar 52 may be coupled to the first guide frame 49 in a manner of being movable up and down along the first guide groove 49*g*. Meanwhile, the first guide groove 49*g* may be closed at the top and the bottom, thereby limiting the vertical movement of the first guide protrusion 521*b*. Alternatively, an upper sensor (not shown), such as a photo sensor, that detects the first guide protrusion 521*b* may be installed adjacent to the top of the first guide groove 49*g*, and a lower sensor (not shown), such as a photo sensor, that detects the first guide protrusion 521*b* may be installed adjacent to the bottom of the first guide groove 49*g*. In this case, the controller C may determine whether the bar 52 reaches a top dead center position or a bottom dead center position based on information obtained from the upper sensor or the lower sensor, and may stop the operation of the motor 31 when the bar 52 reaches the top dead center or the bottom dead center.

Meanwhile, a first coupler 62 may be disposed between the auxiliary roller 60 and the inside of the first mount 59. One portion of the first coupler 62 may be inserted into the first mount 59, and another portion 621 of the first coupler 62 may be inserted into the auxiliary roller 60.

In this case, the auxiliary roller 60 may be positioned under the bar 52, and may be rotatably coupled to the first coupler 62. Alternatively, the auxiliary roller 60 may be fixed to the first coupler 62.

Referring to FIGS. 18 and 19, a second mount 58 may extend in a direction intersecting the roller 50, and may be adjacent to a second end (e.g., a left end) of the second frame 24*b*. A fastening member such as a screw may pass through a hole 580*a* formed in the second mount 58 to be fastened to the rear side of the second frame 24*b*. Accordingly, the second mount 58 may be coupled to the second frame 24*b*.

A second guide frame 48 may extend vertically above the second mount 58, and may be adjacent to a second end (e.g., a left end) of the bar 52. A fastening member such as a screw may pass through a hole (no reference numeral) formed in the second guide frame 48 to be fastened to a rear side of the third frame 24*c*. Accordingly, the second guide frame 48 may be coupled to the third frame 24*c*.

In the longitudinal direction of the roller 50, the second mount 58 may be located at the end of the roller 50. In the longitudinal direction of the roller 50, a second end (e.g., a left end) of the roller 50 may be connected to the second mount 58. A second cap 58*a* may be coupled to an outer surface of the second mount 58 by a fastening member such as a screw, and a portion of the second cap 58*a* may be inserted into the roller 50.

In the longitudinal direction of the auxiliary roller 60, the second mount 58 may be located at the end of the auxiliary roller 60. In the longitudinal direction of the auxiliary roller 60, a second end (e.g., a left end) of the auxiliary roller 60 may be connected to the second mount 58. The second end of the auxiliary roller 60 may be referred to as a second insertion portion 61, and the second insertion portion 61 may be inserted into or pass through the first mount 59.

For example, a portion of the second wire 40*a* parallel to the longitudinal direction of the roller 50 may be spaced apart from the roller 50 in the radial direction of the roller 50, and may be located rearward relative to the roller 50 (see FIG. 18).

In this case, the second guide pulley 41*a* may be coupled to the second mount 58. Alternatively, the second guide pulley 41*a* may be fixed to the second mount 58.

A second rear pulley 411*a* may be adjacent to a rear end of the second mount 58, and may be rotatably coupled to the second mount 58 in the vertical direction. A rotation axis of the second rear pulley 411*a* may be parallel to the rotation axis of the second tension pulley 36. The second rear pulley 411*a* may be spaced apart from the second tension pulley 36 in the longitudinal direction of the roller 50, the second rear pulley 411*a* may be located substantially at the same position as the second tension pulley 36 in the vertical direction, and the second rear pulley 411*a* may be located forward relative to the second tension pulley 36.

A second front pulley 412*a* may be adjacent to a front end of the second mount 58, and may be rotatably coupled to an outer surface of the second mount 58 in the horizontal direction. A rotation axis of the second front pulley 412*a* may be parallel to the longitudinal direction of the roller 50. The roller 50 may be positioned between the second rear pulley 411*a* and the second front pulley 412*a* in the front-and-rear direction, the second front pulley 412*a* may be located at a higher position than the first rear pulley 411*a* in the vertical direction, and the second front pulley 412*a* may be spaced downward from the auxiliary roller 60.

A second upper pulley 42*a* may be disposed opposite the second mount 58 with respect to the second guide frame 48. The second upper pulley 42*a* may be positioned at or adjacent to a corner where the first frame 24*a* and the third frame 24*c* meet, and may be rotatably coupled to or fixed to the first frame 24*a* and/or the third frame 24*c*. A rotation axis of the second upper pulley 42*a* may be parallel to the front-and-rear direction. The second upper pulley 42*a* may be located rightward relative to the second front pulley 412*a*.

The second wire 40*a* may be engaged with the outer circumference of the second tension pulley 36, and may be bent by the second tension pulley 36. The second wire 40*a* may extend in the longitudinal direction of the roller 50 between the second tension pulley 36 and the second rear pulley 411*a*. The second wire 40*a* may be engaged with an outer circumference of the second rear pulley 411*a*, and may be bent 90 degrees with respect to the y-axis by the second rear pulley 411*a*. The second wire 40*a* may extend in the front-and-rear direction between the second rear pulley 411*a* and the second front pulley 412*a*. The second wire 40*a* may be engaged with an outer circumference of the second front pulley 412*a*, and may be bent 90 degrees with respect to the x-axis by the second front pulley 412*a*. The second wire 40*a* may extend in the vertical direction between the second front pulley 412*a* and the second upper pulley 42*a*. The second wire 40*a* may be engaged with an outer circumference of the second upper pulley 42*a*, and may be bent 180 degrees with respect to the z-axis by the second upper pulley 42*a*. Between the second front pulley 412*a* and the second upper pulley 42*a*, the second wire 40*a* may extend in the vertical direction on the left side of the second guide frame 48, and the second wire 40*a* may extend in the vertical direction on the right side of the second guide frame 48.

As another example, a portion of the second wire 40*a* parallel to the longitudinal direction of the roller 50 may be spaced apart from the roller 50 in the radial direction of the roller 50, and may be located forward relative to the roller (see FIGS. 12 and 13).

In this case, the second guide pulley 41*a* may be rotatably coupled to the second frame 24*b* (see FIG. 9). Alternatively, the second guide pulley 41*a* may be fixed to the second frame 24*b*.

A rotation axis of the second guide pulley 41*a* (see FIG. 9) may be parallel to the front-and-rear direction. The second guide pulley 41*a* (see FIG. 9) may be spaced apart from the second tension pulley 36 (see FIGS. 12 and 13) in the longitudinal direction of the roller 50, and the second guide pulley 41*a* may be located at a higher position than the second tension pulley 36 in the vertical direction.

The second upper pulley 42*a* (see FIG. 9) may be disposed opposite the second mount 58 with respect to the second guide frame 48. The second upper pulley 42*a* may be positioned at or adjacent to a corner where the first frame 24*a* and the third frame 24*c* meet, and may be rotatably coupled to or fixed to the first frame 24*a* and/or the third frame 24*c*. A rotation axis of the second upper pulley 42*a* may be parallel to the front-and-rear direction. In the vertical direction, the second upper pulley 42*a* may be aligned with the second guide pulley 41*a*.

The second wire 40*a* may be engaged with the outer circumference of the second tension pulley 36 (see FIGS. 12 and 13), and may be bent by the second tension pulley 36. The second wire 40*a* may extend in the longitudinal direction of the roller 50 between the second tension pulley 36 and the second guide pulley 41*a* (see FIG. 9). The second wire 40*a* may be engaged with an outer circumference of the second guide pulley 41*a*, and may be bent 90 degrees with respect to the z-axis by the second guide pulley 41*a*. The second wire 40*a* may extend in the vertical direction between the second guide pulley 41*a* and the second upper pulley 42*a*. The second wire 40*a* may be engaged with an outer circumference of the second upper pulley 42*a*, and may be bent 180 degrees with respect to the z-axis by the second upper pulley 42*a*. Between the second guide pulley 41*a* and the second upper pulley 42*a*, the second wire 40*a* may extend in the vertical direction on the left side of the second guide frame 48, and the second wire 40*a* may extend in the vertical direction on the right side of the second guide frame 48.

Referring to FIG. 20, the bar 52 may include an inner bar 521 and an outer bar 522. The inner bar 521 may extend in the longitudinal direction of the roller 50, and may generally have the shape of a solid square lumber. The outer bar 522 may extend along the inner bar 521, may generally have the shape of a C-shaped beam, and may cover the inner bar 521.

A second wire hole 522*a* may be adjacent to a second end (e.g., a left end) of the outer bar 522, and may be formed through an upper surface of the outer bar 522. An end of the second wire 40*a* may pass through the second wire hole 522*a*, and may be fixed to the outer bar 522 and/or the inner bar 521.

A second guide protrusion 521*a* may protrude leftward from a second end (e.g., a left end) of the inner bar 521. The second guide protrusion 521a may define a second end (e.g., a left end) of the bar 52.

A second guide groove 48*g* may be formed in a right side or surface of the second guide frame 48, and may extend vertically. The second guide protrusion 521*a* may be inserted into the second guide groove 48*g* so as to be movable in the vertical direction.

Accordingly, the bar 52 may be coupled to the second guide frame 48 in a manner of being movable up and down along the second guide groove 48*g*. Meanwhile, the second guide groove 48*g* may be closed at the top and the bottom, thereby limiting the vertical movement of the second guide protrusion 521*a*. Alternatively, an upper sensor (not shown), such as a photo sensor, that detects the second guide protrusion 521*a* may be installed adjacent to the top of the second guide groove 48*g*, and a lower sensor (not shown), such as a photo sensor, that detects the second guide protrusion 521*a* may be installed adjacent to the bottom of the second guide groove 48*g*. In this case, the controller C may determine whether the bar 52 reaches a top dead center position or a bottom dead center position based on information obtained from the upper sensor or the lower sensor, and may stop the operation of the motor 31 when the bar 52 reaches the top dead center or the bottom dead center.

Meanwhile, a second coupler 61 may be disposed between the auxiliary roller 60 and the inside of the second mount 58. One portion of the second coupler 61 may be inserted into the second mount 58, and another portion 621 of the second coupler 61 may be inserted into the auxiliary roller 60.

In this case, the auxiliary roller 60 may be positioned under the bar 52, and may be rotatably coupled to the second coupler 61. Alternatively, the auxiliary roller 60 may be fixed to the first coupler 62.

Referring back to FIG. 11, in response to the operation of the motor 31, the first wire 40*b* and the second wire 40*a* may be wound around or unwound from the first gear 33 and the second gear 34, respectively.

When the worm 32 rotates in a first rotational direction in response to the operation of the motor 31, the first gear 33 may rotate counterclockwise, and the second gear 34 may rotate clockwise. In response to the rotation of the first gear 33, the first wire 40*b* may be wound around the first groove 33G of the first gear 33, and accordingly, the first wire 40*b* may pull the bar 52 upward (see FIGS. 16 and 17). In response to the rotation of the second gear 34, the second wire 40*a* may be wound around the second groove 34G of the second gear 34, and accordingly, the second wire 40*a* may pull the bar 52 upward (see FIGS. 19 and 20).

In this case, as the bar 52 is raised, the cover 51 may be unwound from the roller 50, allowing the cover 51 to gradually cover the rear of the display 10 (see FIG. 9). This operation of the drive assembly 30 may be referred to as an unrolling operation or a light-shielding operation.

When the worm 32 rotates in a second rotational direction opposite to the first rotational direction in response to the operation of the motor 31, the first gear 33 may rotate clockwise, and the second gear 34 may rotate counterclockwise. In response to the rotation of the first gear 33, the first wire 40*b* may be unwound from the first groove 33G of the first gear 33, and the roller 50 may rotate in a direction in which the cover 51 is wound around the roller 50 by the elastic force of an elastic member (501*a*, 502*a*) (see FIGS. 23 and 24) described later, and the bar 52 may pull the first wire 40*b* downward (see FIGS. 16 and 17). In response to the rotation of the second gear 34, the second wire 40*a* may be unwound from the second groove 34G of the second gear 34, and the roller 50 may rotate in a direction in which the cover 51 is wound around the roller 50 by the elastic force of an elastic member (501*a*, 502*a*) (see FIGS. 23 and 24) described later, and the bar 52 may pull the second wire 40*a* downward (see FIGS. 19 and 20).

In this case, as the bar 52 is lowered, the cover 51 may be wound around the roller 50, allowing the cover 51 to gradually open the rear of the display 10 (see FIG. 9). This operation of the drive assembly 30 may be referred to as a rolling operation or an opening operation.

Referring to FIGS. 21 and 22, the cover 51, which is unwound from the roller 50 in response to the aforementioned unrolling operation, may cover the rear of the display 10 (see FIG. 9). Here, the second wire 40*a* may be wound around the second groove 34G multiple times.

A depth Rg of the second groove 34G may be sufficient enough for the second wire 40*a* to be wound multiple times. For example, the second wire 40*a* may be wound around the second groove 34G up to 6 times (see Na, Nb, Nc, Nd, Ne, and Nf in FIG. 21).

A width Wg of the second groove 34G may be greater than a diameter Dw of the second wire 40*a* but less than twice the diameter Dw. That is, the second wire 40*a* may be disposed in a zigzag manner and may be wound around the second groove 34G multiple times. For example, the diameter Dw may be about 0.6 mm.

The descriptions of the second wire 40*a* and the second groove 34G may be equally applied to the first wire 40*b* and the first groove 33G (see FIG. 11). That is, the first wire 40*b* may have a diameter substantially equal to the diameter of the second wire 40*a*, and the first groove 33G may have a width substantially equal to the width of the second groove 34G. The first wire 40*b* may be disposed in a zigzag manner and may be wound around the first groove 33G multiple times.

Accordingly, an extent to which the second wire 40*a* is wound around the second groove 34G may be in synch with an extent to which the first wire 40*b* is wound around the first groove 33G. As a result, a height difference between an upper left end and an upper right end of the cover 51 may be minimized.

Referring to FIGS. 23 and 24, the roller 50 may have a hollow cylindrical shape. Shafts 502 and 501, holders 50*b* and 50*a*, and elastic members 502*a* and 501*a* may be disposed in the roller 50.

A first shaft 502 may extend along the roller 50 inside the roller 50. A length of the first shaft 502 may be less than a length of the roller 50. The first cap 59*a* may be fixed to the first mount 59. An insertion portion of the first cap 59*a* may be inserted into the roller 50, and the roller 50 may be rotatably coupled to the first cap 59*a*. One end of the first shaft 502 may be inserted into and fixed to the insertion portion of the first cap 59*a*.

A first holder 50*b* may be adjacent to the other end of the first shaft 502 inside the roller 50. The first shaft 502 may pass through the first holder 50*b*, and the first holder 50*b* may be fixed to the inside of the roller 50. That is, the first holder 50*b* and the roller 50 may rotate with respect to the first shaft 502.

A first elastic member 502*a* may be disposed between the insertion portion of the first cap 59*a* and the first holder 50*b* inside the roller 50, and may be wound in the form of a coil around an outer circumference of the first shaft 502. The first elastic member 502*a* may be referred to as a coiled spring or a torsion spring. One end of the first elastic member 502*a* may be fixed to the insertion portion of the first cap 59*a*, and the other end of the first elastic member 502*a* may be fixed to the first holder 50*b*.

Accordingly, when the roller 50 rotates with respect to the first cap 59*a*, the first elastic member 502*a* may be elastically deformed or elastically restored.

A second shaft 501 may extend along the roller 50 inside the roller 50. A length of the second shaft 501 may be less than the length of the roller 50. The second cap 58*a* may be fixed to the second mount 58. An insertion portion of the second cap 58*a* may be inserted into the roller 50, and the roller 50 may be rotatably coupled to the second cap 58*a*. One end of the second shaft 501 may be inserted into and fixed to the insertion portion of the second cap 58*a*.

A second holder 50*a* may be adjacent to the other end of the second shaft 501 inside the roller 50. The second shaft 501 may pass through the second holder 50*a*, and the second holder 50*a* may be fixed to the inside of the roller 50. That is, the second holder 50*a* and the roller 50 may rotate with respect to the second shaft 501.

The second elastic member 501*a* may be disposed between the insertion portion of the second cap 58*a* and the second holder 50*a* inside the roller 50, and may be wound in the form of a coil around an outer circumference of the second shaft 50. The second elastic member 501*a* may be referred to as a coiled spring or a torsion spring. One end of the second elastic member 501*a* may be fixed to the insertion portion of the second cap 58*a*, and the other end of the second elastic member 501*a* may be fixed to the second holder 50*a*.

Accordingly, when the roller 50 rotates with respect to the second cap 58*a*, the second elastic member 501*a* may be elastically deformed or elastically restored.

In detail, in response to the aforementioned unrolling operation, the roller 50 may be rotated in an unrolling direction by the cover 51 being unwound from the roller 50, and the elastic members 502*a* and 501*a* may be elastically deformed. In response to the aforementioned rolling operation, the roller 50 may be rotated in a rolling direction opposite to the unrolling direction by the restoring force of the elastic members 502*a* and 501*a*, allowing the cover 51 to be wound around the roller 50.

In some embodiments, the shafts 502 and 501 may be provided as a single member having a length corresponding to the roller 50, the holders 50*b* and 50*a* may be provided as a single member disposed adjacent to one end or the other end of the roller 50, and the elastic members 502*a* and 501*a* may be provided as a single member fixed to the first cap 59*a* or the second cap 58*a* while being fixed to the holder 50*b*, 50*a*.

Referring to FIG. 25, the visibility of an image output by the display 10 may vary according to whether the cover 51 covers the rear of the display 10.

Referring to the upper diagram of FIG. 25, the cover 51 may not cover the rear of the display 10. For example, the display 10 may not output an image, and a user in front of the display 10 can see behind the display 10 (see the man in a hat (Mh) indicated by a dotted line). As another example, the display 10 may output an image, and a user in front of the display 10 can see the image (see the fish (Fs) indicated by solid lines) and behind the display 10 (see the man in a hat (Mh) indicated by a dotted line). This mode may be referred to as a transparent mode (or light-transmitting mode).

Referring to the lower diagram of FIG. 25, the cover 51 may cover the rear of the display 10. The display 10 may or may not output an image, and a user in front of the display 10 cannot see behind the display 10. This mode may be referred to as a light-shielding mode.

The visibility of an image output by the display 10 in the light-shielding mode may be enhanced compared to the visibility of an image output by the display 10 in the transparent mode (see and compare the fish (Fs) indicated by thin lines and the fish (F) indicated by thick lines in FIG. 25).

Meanwhile, the side frame 20 (see FIG. 1) may include a first side frame 22, a second side frame 23, and a third side frame 23. The first side frame 22 may cover the left side of the display 10 and the third frame 24*c*. The second side frame 23 may cover the right side of the display 10 and the fourth frame 24*d*. The third side frame 24 may cover the upper side of the display 10 and the first frame 24*a*.

Referring to the upper diagram of FIG. 26, the cover 51 may not cover the rear of the display 10. This mode may be referred to as a full transparent mode.

Referring to the middle diagram of FIG. 26, the cover 51 may cover a portion of the rear of the display 10. This mode may be referred to as a partial light-shielding mode or a partial transparent mode.

Referring to the lower diagram of FIG. 26, the cover 51 may entirely cover the rear of the display 10. This mode may be referred to as a full light-shielding mode.

The controller C (see FIG. 2) of the display device 1 may control the operation of the drive assembly 30 (see FIG. 2) to switch a mode of the display 10 to the light-shielding mode or the transparent mode. In this case, the controller C may switch the mode of the display 10 based on information obtained from a sensor (not shown) that detects the top dead center and/or bottom dead center of the cover 51.

Referring to FIGS. 1 to 26, a display device according to an aspect of the present disclosure may include: a display panel with translucency: a cover disposed at a rear of the display panel: a roller adjacent to one side of the display panel and extending along the one side, the roller around which the cover is wound or from which the cover is unwound; and a drive assembly which moves the cover in a direction away from or toward the one side of the display panel. The drive assembly may include: a first wire adjacent to one end of the cover in a longitudinal direction of the roller, and fixed to the cover; a second wire adjacent to the other end of the cover in the longitudinal direction of the roller, and fixed to the cover; and a motor providing power to the first wire and the second wire.

The display panel may include: a first side adjacent to the roller; and a second side opposite the first side. The first wire and the second wire may move the cover in a direction in which the first side and the second side are spaced apart from each other.

The drive assembly may further include: a first gear configured to receive power from the motor, the first gear having a first groove around an outer circumference of the first gear: and a second gear configured to engage with the first gear, the second gear having a second groove around an outer circumference of the second gear. The first wire may be wound around or unwound from the first gear, and the second wire may be wound around or unwound from the second gear.

A diameter of the first wire may be substantially equal to a diameter of the second wire. A width of the first groove may be substantially equal to a width of the second wire.

The width of the first groove may be greater than the diameter of the first wire but may be less than twice the diameter of the first wire.

The drive assembly may further include: a worm fixed to a rotating shaft of the motor and configured to mesh with the first gear. The first gear and the second gear may each be a helical gear.

The display device may further include: a mount to which the roller is rotatably coupled: and a cap fixed to the mount, the cap having an insertion portion positioned inside the roller. The roller may include: a shaft extending in the longitudinal direction of the roller inside the roller, the shaft having one end fixed to the insertion portion: a holder adjacent to the other end of the shaft and through which the shaft passes, the holder being fixed into the roller; and an elastic member wound in the form of a coil around an outer circumference of the shaft, the elastic member having one end fixed to the insertion portion and the other end fixed to the holder.

The drive assembly may further include: a plurality of first pulleys to change a direction of the first wire unwound from the first gear; and a plurality of second pulleys to change a direction of the second wire unwound from the second gear. The first pulleys and the second pulleys may be symmetric to each other with respect to a contact point between the first gear and the second gear.

The first gear and the second gear may be adjacent to the roller. A rotation axis of the first gear may be parallel to a direction in which the cover unwound from the roller moves. The drive assembly may further include: a first tension pulley spaced apart from the first gear in a radial direction of the first gear, the first tension pulley being configured to rotate about a rotation axis parallel to the rotation axis of the first gear; a first guide pulley adjacent to one end of the roller; and a first upper pulley spaced apart from the first guide pulley in a moving direction of the cover unwound from the roller. The first wire may be sequentially engaged with the first tension pulley, the first guide pulley, and the first upper pulley.

The first wire bent by the first tension pulley may be located closer to the display panel than the roller. The first guide pulley and the first upper pulley may each have a rotation axis parallel to a front-and-rear direction, the first guide pulley and the first upper pulley being aligned with each other in the moving direction of the cover unwound from the roller.

The first wire bent by the first tension pulley may be located farther from the display panel than the roller. The first guide pulley may further include: a first rear pulley configured to rotate about a rotation axis parallel to the rotation axis of the first tension pulley; and a first front pulley located closer to the display panel than the first rear pulley, the first front pulley being configured to rotate about a rotation axis parallel to the longitudinal direction of the roller. A rotation axis of the first upper pulley may be parallel to a front-and-rear direction.

The cover may include: a first end fixed to the roller; and a second end opposite the first end. The display device may further include a bar to which the second end of the cover is fixed, the bar extending in the longitudinal direction of the roller. The first wire may be adjacent to one end of the bar in a longitudinal direction of the bar and may be fixed to the bar. The second wire may be adjacent to the other end of the bar in the longitudinal direction of the bar and may be fixed to the bar.

The display device may further include: an auxiliary roller extending in the longitudinal direction of the roller, the auxiliary roller being disposed between the roller and the bar. The cover unwound from the roller may be parallel to the display panel between the bar and the auxiliary roller.

The display device may further include: a first guide frame adjacent to the one end of the bar in the longitudinal direction of the bar, the first guide frame having a first guide groove extending in a direction perpendicular to the one side of the display panel: and a second guide frame adjacent to the other end of the bar in the longitudinal direction of the bar, the second guide frame having a second guide groove extending in a longitudinal direction of the first guide groove. The bar may include: a first guide protrusion protruding from the one end of the bar in the longitudinal direction of the bar toward the first guide groove, the first guide protrusion being movably inserted into the first guide groove: and a second guide protrusion protruding from the other end of the bar in the longitudinal direction of the bar toward the second guide groove, the second guide protrusion being movably inserted into the second guide groove.

The cover may be configured to open, close, or partially close the rear of the display panel.

Certain embodiments or other embodiments of the disclosure described above are not mutually exclusive or distinct from each other. Any or all elements of the embodiments of the disclosure described above may be combined or combined with each other in configuration or function.

For example, a configuration "A" described in one embodiment of the disclosure and the drawings, and a configuration "B" described in another embodiment of the disclosure and the drawings may be combined with each other. Namely, although the combination between the configurations is not directly described, the combination is possible except in the case where it is described that the combination is impossible.

The above detailed description is to be construed in all aspects as illustrative and not restrictive. The scope of the present disclosure should be determined by reasonable interpretation of the appended claims, and all changes coming within the equivalency range of the present disclosure are intended to be embraced in the scope of the present disclosure.

The invention claimed is:

1. A display device comprising:

a display panel with translucency;

a cover disposed at a rear of the display panel;

a roller adjacent to one side of the display panel and extending along the one side, the roller around which the cover is wound or from which the cover is unwound; and a drive assembly which moves the cover in a direction away from or toward the one side of the display panel, wherein the drive assembly comprises:

a first wire adjacent to one end of the cover in a longitudinal direction of the roller, and fixed to the cover;

a second wire adjacent to the other end of the cover in the longitudinal direction of the roller, and fixed to the cover; and a motor providing power to the first wire and the second wire.

2. The display device of claim 1, wherein the display panel comprises:

a first side adjacent to the roller; and a second side opposite the first side, and wherein the first wire and the second wire move the cover in a direction in which the first side and the second side are spaced apart from each other.

3. The display device of claim 1, wherein the drive assembly further comprises:

a first gear receiving power from the motor, the first gear having a first groove around an outer circumference of the first gear; and a second gear engaged with the first gear, the second gear having a second groove around an outer circumference of the second gear, wherein the first wire is wound around or unwound from the first gear, and wherein the second wire is wound around or unwound from the second gear.

4. The display device of claim 3, wherein a diameter of the first wire is substantially equal to a diameter of the second wire, and wherein a width of the first groove is substantially equal to a width of the second wire.

5. The display device of claim 4, wherein the width of the first groove is greater than the diameter of the first wire but is less than twice the diameter of the first wire.

6. The display device of claim 3, wherein the drive assembly further comprises a worm fixed to a rotating shaft of the motor and engaged with the first gear, and wherein the first gear and the second gear are each a helical gear.

7. The display device of claim 6, further comprising:

a mount to which the roller is rotatably coupled; and a cap fixed to the mount, and including an insertion portion positioned inside the roller, wherein the roller comprises:

a shaft extending in the longitudinal direction of the roller inside the roller, and having one end fixed to the insertion portion;

a holder adjacent to the other end of the shaft, through which the shaft passes, and fixed into the roller; and an elastic member wound in the form of a coil around an outer circumference of the shaft, having one end fixed to the insertion portion, and having the other end fixed to the holder.

8. The display device of claim 3, wherein the drive assembly further comprises:

a plurality of first pulleys to change a direction of the first wire unwound from the first gear; and a plurality of second pulleys to change a direction of the second wire unwound from the second gear, and wherein the first pulleys and the second pulleys are symmetric to each other with respect to a contact point between the first gear and the second gear.

9. The display device of claim 3, wherein the first gear and the second gear are adjacent to the roller, wherein a rotation axis of the first gear is parallel to a direction in which the cover unwound from the roller moves, wherein the drive assembly further comprises:

a first tension pulley spaced apart from the first gear in a radial direction of the first gear, and which is rotatable about a rotation axis parallel to the rotation axis of the first gear;

a first guide pulley adjacent to one end of the roller; and a first upper pulley spaced apart from the first guide pulley in a moving direction of the cover unwound from the roller, and wherein the first wire is sequentially hung on the first tension pulley, the first guide pulley, and the first upper pulley.

10. The display device of claim 9, wherein the first wire bent by the first tension pulley is located closer to the display panel than the roller, and wherein the first guide pulley and the first upper pulley each have a rotation axis parallel to a front-and-rear direction, the first guide pulley and the first upper pulley being aligned with each other in the moving direction of the cover unwound from the roller.

11. The display device of claim 9, wherein the first wire bent by the first tension pulley is located farther from the display panel than the roller, wherein the first guide pulley further comprises:

a first rear pulley which is rotatable about a rotation axis parallel to the rotation axis of the first tension pulley; and a first front pulley located closer to the display panel than the first rear pulley, and which is rotatable about a rotation axis parallel to the longitudinal direction of the roller, and wherein a rotation axis of the first upper pulley is parallel to a front-and-rear direction.

12. The display device of claim 1, wherein the cover comprises:

a first end fixed to the roller; and a second end opposite the first end, wherein the display device further comprises a bar to which the second end of the cover is fixed, and extending in the longitudinal direction of the roller, wherein the first wire is adjacent to one end of the bar in a longitudinal direction of the bar and is fixed to the bar, and wherein the second wire is adjacent to the other end of the bar in the longitudinal direction of the bar and is fixed to the bar.

13. The display device of claim 12, further comprising an auxiliary roller extending in the longitudinal direction of the roller, and disposed between the roller and the bar, wherein the cover unwound from the roller is parallel to the display panel between the bar and the auxiliary roller.

14. The display device of claim 12, further comprising:

a first guide frame adjacent to the one end of the bar in the longitudinal direction of the bar, and having a first guide groove extending in a direction perpendicular to the one side of the display panel; and a second guide frame adjacent to the other end of the bar in the longitudinal direction of the bar, and having a second guide groove extending in a longitudinal direction of the first guide groove, wherein the bar comprises:

a first guide protrusion protruding from the one end of the bar in the longitudinal direction of the bar toward the first guide groove, and which is movably inserted into the first guide groove; and a second guide protrusion protruding from the other end of the bar in the longitudinal direction of the bar toward the second guide groove, and which is movably inserted into the second guide groove.

15. The display device of claim 1, wherein the cover opens, closes, or partially closes the rear of the display panel.

* * * * *